United States Patent
Buchan et al.

(10) Patent No.: US 11,182,587 B2
(45) Date of Patent: Nov. 23, 2021

(54) ULTRASONIC FINGERPRINT SENSOR WITH LOW-FREQUENCY VIBRATION SOURCE

(71) Applicant: QUALCOMM Incorporated, San Diego, CA (US)

(72) Inventors: Nicholas Ian Buchan, San Jose, CA (US); Hrishikesh Vijaykumar Panchawagh, Cupertino, CA (US); Jessica Liu Strohmann, Cupertino, CA (US); Sandeep Louis D'Souza, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/751,820

(22) Filed: Jan. 24, 2020

(65) Prior Publication Data
US 2021/0073502 A1    Mar. 11, 2021

Related U.S. Application Data

(60) Provisional application No. 62/896,520, filed on Sep. 5, 2019.

(51) Int. Cl.
*G06K 9/00* (2006.01)
*G06F 21/32* (2013.01)
(Continued)

(52) U.S. Cl.
CPC ..... *G06K 9/00067* (2013.01); *G01N 29/2437* (2013.01); *G06F 3/016* (2013.01); *G06F 3/0433* (2013.01); *G06F 21/32* (2013.01); *G06K 9/0002* (2013.01); *G06K 9/38* (2013.01); *G06K 9/4604* (2013.01); *H01L 41/0825* (2013.01)

(58) Field of Classification Search
CPC .. G06K 9/0002; G01N 29/2437; G06F 3/016; G06F 3/0433; G06F 21/32; H01L 41/0825
See application file for complete search history.

(56) References Cited

U.S. PATENT DOCUMENTS

2014/0354596 A1* 12/2014 Djordjev ............... G06F 3/0421
345/175
2015/0241393 A1   8/2015 Ganti et al.
(Continued)

FOREIGN PATENT DOCUMENTS

CN         108924277 A    11/2018
EP           3709214 A2    9/2020

OTHER PUBLICATIONS

Thao, Pham Ngoc et al., "Fabrication and Characterization of PZT Fibered-Epitaxial Thin Film on Si for Piezoelectric Micromachined Ultrasound Transducer," Micromachines, Sep. 11, 2018. 15 pgs.
(Continued)

*Primary Examiner* — Stephen G Sherman
(74) *Attorney, Agent, or Firm* — Qualcomm Incorporated

(57) ABSTRACT

An apparatus may include an ultrasonic sensor system, a low-frequency vibration source and a control system. The ultrasonic sensor system may include an ultrasonic receiver and an ultrasonic transmitter configured for transmitting ultrasonic waves in a first frequency range (e.g., 1 MHz to 30 MHz). The low-frequency vibration source may be configured for generating low-frequency vibrations in a second frequency range (e.g., the range of 5 Hz to 2000 Hz). The control system may be configured for synchronizing the generation of the first low-frequency vibrations and the transmission of the first ultrasonic waves.

23 Claims, 23 Drawing Sheets

(51) Int. Cl.
  G06K 9/46   (2006.01)
  G06K 9/38   (2006.01)
  G01N 29/24  (2006.01)
  G06F 3/01   (2006.01)
  G06F 3/043  (2006.01)
  H01L 41/08  (2006.01)

(56) References Cited

U.S. PATENT DOCUMENTS

| | | |
|---|---|---|
| 2016/0246396 A1 | 8/2016 | Dickinson et al. |
| 2016/0247341 A1 | 8/2016 | Talwerdi |
| 2017/0090024 A1 | 3/2017 | Kitchens, II et al. |
| 2017/0110504 A1 | 4/2017 | Panchawagh et al. |
| 2018/0032785 A1* | 2/2018 | Li .................. G06F 13/24 |
| 2018/0046836 A1* | 2/2018 | Hinger .............. G06K 9/0002 |
| 2018/0373913 A1 | 12/2018 | Panchawagh et al. |
| 2019/0043920 A1 | 2/2019 | Berger et al. |
| 2019/0250752 A1* | 8/2019 | Shim ................ G06F 3/0414 |
| 2019/0370519 A1 | 12/2019 | Kuo et al. |
| 2020/0293737 A1* | 9/2020 | Kim .................. G06F 3/016 |
| 2020/0410194 A1 | 12/2020 | Kim et al. |
| 2021/0073511 A1 | 3/2021 | Buchan et al. |

OTHER PUBLICATIONS

International Search Report and Written Opinion—PCT/US2020/040159—ISA/EPO—dated Oct. 14, 2020.

* cited by examiner

Image Background with Fingerprint Features Shifted by lateral translation

Image Background with Fingerprint Features Rotated

ULTRASONIC FINGERPRINT SENSOR WITH LOW-FREQUENCY VIBRATION SOURCE

PRIORITY CLAIM AND CROSS-REFERENCE TO RELATED APPLICATION

This application claims priority to U.S. Provisional Patent Application No. 62/896,520, filed on Sep. 5, 2019 and entitled "ULTRASONIC FINGERPRINT SENSOR WITH LOW-FREQUENCY VIBRATION SOURCE," which is hereby incorporated by reference. This application is related to U.S. patent application Ser. No. 16/751,849, entitled "ULTRASONIC FINGERPRINT SENSOR WITH LOW-FREQUENCY VIBRATION SOURCE," which is being filed on the same day as the present application and which is hereby incorporated by reference.

TECHNICAL FIELD

This disclosure relates generally to ultrasonic sensor systems and methods for using such systems.

DESCRIPTION OF THE RELATED TECHNOLOGY

Ultrasonic fingerprint sensors have been included in devices such as smartphones, cash machines and cars to authenticate a user. Although some existing ultrasonic fingerprint sensors can provide satisfactory performance, improved ultrasonic fingerprint sensors would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include an ultrasonic sensor system and a control system that is configured for communication with the ultrasonic sensor system. In some examples, at least a portion of the control system may be coupled to the ultrasonic sensor system. In some implementations, a mobile device may be, or may include, the apparatus. For example, a mobile device may include an apparatus as disclosed herein. In some examples, the apparatus may include a platen.

According to some examples, the ultrasonic sensor system includes an ultrasonic receiver and an ultrasonic transmitter configured for transmitting ultrasonic waves in the range of 1 MHz to 30 MHz. In some examples, an ultrasonic transceiver layer may include the ultrasonic transmitter and the ultrasonic receiver. The ultrasonic transmitters disclosed herein may be referred to as "transmitting means" or "means for transmitting ultrasonic waves. The ultrasonic receivers disclosed herein may be referred to as "receiving means" or "means for receiving ultrasonic waves.

In some implementations, the apparatus includes a low-frequency vibration source. According to some examples, the ultrasonic sensor system may be configured for functioning as a low-frequency vibration source. A single device may include the low-frequency vibration source and the ultrasonic transmitter. However, in some instances the low-frequency vibration source may be a separate device, such as a haptic device or a speaker. In some implementations, the low-frequency vibration source may be configured for generating low-frequency vibrations in the range of 5 Hz to 2000 Hz. In some examples, the low-frequency vibration source may be, or may include, a piezoelectric actuator, an eccentric rotating mass and/or a linear resonant actuator. The low-frequency vibration sources disclosed herein may be referred to as "generating means" or "means for generating low-frequency vibrations."

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for controlling an ultrasonic transmitter for transmission of first ultrasonic waves and controlling the low-frequency vibration source for generation of first low-frequency vibrations. The control systems disclosed herein, or portions thereof, may be referred to as "control means."

In some implementations, the control system may be configured for synchronizing the generation of the first low-frequency vibrations and the transmission of the first ultrasonic waves. In some such implementations, synchronizing the generation of the first low-frequency vibrations and the transmission of the first ultrasonic waves may involve controlling the low-frequency vibration source for generation of the first low-frequency vibrations during a first time interval and controlling the ultrasonic transmitter for transmission of the first ultrasonic waves during a second time interval that is after the first time interval. However, in some implementations synchronizing the generation of the first low-frequency vibrations and the transmission of the first ultrasonic waves may involve controlling the low-frequency vibration source for generation of the first low-frequency vibrations during a first time interval and controlling the ultrasonic transmitter for transmission of the first ultrasonic waves during a second time interval that at least partially coincides with the first time interval.

According to some examples, the control system may be configured for receiving ultrasonic receiver signals from the ultrasonic receiver. The ultrasonic receiver signals may include signals corresponding to reflections of the first ultrasonic waves from a target object in contact with an outer surface of the apparatus. In some such examples, the control system may be configured for performing an authentication process based, at least in part, on the ultrasonic receiver signals. The outer surface may be a platen, a display cover glass, etc., depending on the particular implementation.

In some examples, the control system may be configured for causing the low-frequency vibration source to generate the first low-frequency vibrations in the plane of the outer surface. Alternatively, or additionally, the control system may be configured for causing the low-frequency vibration source to generate the first low-frequency vibrations perpendicular to the plane of the outer surface.

In some examples, the low-frequency vibration source may be configured to cause localized low-frequency vibration of only a portion of the apparatus. In other implementations, the low-frequency vibration source may be configured to cause global low-frequency vibration of the entire apparatus, or of substantially the entire apparatus. In some examples, the control system may be configured for controlling the low-frequency vibration source to generate a single frequency. In other examples, the control system may be configured for controlling the low-frequency vibration source to generate multiple frequencies. In some instances, the control system may be configured for controlling the low-frequency vibration source to generate low-frequency vibrations continuously, e.g., during a time interval. In other examples the control system may be configured for controlling the low-frequency vibration source to generate low-frequency vibrations intermittently, e.g., during a time interval.

In some implementations, the control system may be configured for extracting features from the ultrasonic receiver signals. The authentication process may be based, at least in part, on the features. In some examples, the control system may be configured for detecting background noise in the ultrasonic receiver signals based, at least in part, on the first low-frequency vibrations. In some examples, the control system may be configured for determining at least one feature quality metric. According to some such examples, the control system may be configured for using the feature quality metric as a feedback signal for the low-frequency vibration source and controlling the low-frequency vibration source based, at least in part, on the feedback signal. In some instances, the control system may be configured for determining whether the at least one feature quality metric is below a feature quality metric threshold and, if it is determined that the at least one feature quality metric is below a feature quality metric threshold, controlling the low-frequency vibration source for generation of second low-frequency vibrations having a higher amplitude than the amplitude of the first low-frequency vibrations.

As noted above, in some implementations synchronizing the generation of first low-frequency vibrations and the transmission of first ultrasonic waves may involve controlling the low-frequency vibration source for generation of the first low-frequency vibrations during a first time interval and controlling the ultrasonic transmitter for transmission of the first ultrasonic waves during a second time interval that at least partially coincides with the first time interval. Some such implementations may involve detecting background noise in the ultrasonic receiver signals based, at least in part, on the first low-frequency vibrations.

According to some examples, the control system may be configured to control the ultrasonic transmitter for a plurality of instances of ultrasonic wave transmission during the first time interval. In some such examples, the control system may be further configured to capture, via the ultrasonic receiver, a plurality of sets of fingerprint image data during the first time interval. Each of the sets of fingerprint image data may correspond to reflections from the target object of ultrasonic waves transmitted during different instances of ultrasonic wave transmission.

The control system may, in some examples, be further configured to extract fingerprint features from each of the sets of fingerprint image data. The control system may, in some such examples, be configured to extract background features from each of the sets of fingerprint image data and to distinguish the background features from the fingerprint features.

According to some implementations, the control system may be further configured to perform a coherent feature detection method that involves synchronizing times during which each of the sets of fingerprint image data are captured by the ultrasonic receiver with a period and a phase of the low-frequency vibrations. In some such implementations, the control system may be configured to multiply each set of fingerprint image data by a corresponding weighting factor of a plurality of weighting factors, to produce weighted fingerprint image data values. Each weighting factor may, for example, correspond to a phase of the low-frequency vibrations.

In some such implementations, the control system may be configured to sum the weighted fingerprint image data values to obtain a plurality of pixel-by-pixel correlations with the low-frequency vibrations. According to some examples, the control system may be configured to determine an absolute value of each of the pixel-by-pixel correlations, to compare each absolute value with a threshold value and to produce a binarized mask based on a comparison of each absolute value with the threshold value. The binarized mask may, for example, indicate edges of one or more of the fingerprint features. In some such examples, the control system may be configured to use the binarized mask to reject one or more of the background features.

According to some implementations, the control system may be configured to perform a non-coherent feature detection method in which the times during which fingerprint images are captured are independent of a period and a phase of the low-frequency vibrations. Various examples are provided herein.

In some implementations, the control system may be configured to cause the low-frequency vibration source for generation of the first low-frequency vibrations in a plane of the outer surface, perpendicular to the plane of the outer surface or both in the plane and perpendicular to the plane of the outer surface. In some examples, a frequency and/or a range of frequencies of the low-frequency vibration source may be tuned to produce a maximum modulation of the fingerprint image features in response to the low-frequency vibrations. In some instances, the control system may be configured to perform a high pass filter or bandpass filter on the ultrasonic receiver signals. According to some examples, the control system may be configured to determine a contact quality metric corresponding to at least one of an image quality metric or a feature quality metric and to determine whether to actuate the low-frequency vibration source based, at least in part, on the contact quality metric.

Other innovative aspects of the subject matter described in this disclosure may be implemented via one or more methods. Some such methods may be, or may include, authentication methods. Some methods may involve controlling an ultrasonic transmitter for transmission of first ultrasonic waves and controlling a low-frequency vibration source for generation of first low-frequency vibrations. Such methods may involve synchronizing the generation of the first low-frequency vibrations and the transmission of the first ultrasonic waves. Such methods may involve receiving ultrasonic receiver signals from an ultrasonic receiver. The ultrasonic receiver signals may include signals corresponding to reflections of the first ultrasonic waves from a target object in contact with an outer surface of an apparatus. Such methods may involve performing an authentication process based, at least in part, on the ultrasonic receiver signals.

According to some examples, synchronizing the generation of first low-frequency vibrations and the transmission of first ultrasonic waves may involve controlling the low-frequency vibration source for generation of the first low-frequency vibrations during a first time interval and controlling the ultrasonic transmitter for transmission of the first ultrasonic waves during a second time interval that is after the first time interval.

However, in some implementations, synchronizing the generation of first low-frequency vibrations and the transmission of first ultrasonic waves may involve controlling the low-frequency vibration source for generation of the first low-frequency vibrations during a first time interval and controlling the ultrasonic transmitter for transmission of the first ultrasonic waves during a second time interval that at least partially coincides with the first time interval. Some such implementations may involve detecting background noise in the ultrasonic receiver signals based, at least in part, on the first low-frequency vibrations.

In some examples, controlling the low-frequency vibration source may involve at least one of causing localized low-frequency vibration of only a portion of the apparatus or global low-frequency vibration of the entire apparatus. In some implementations, controlling the low-frequency vibration source and controlling the ultrasonic transmitter may involve controlling a single device, whereas in other implementations controlling the low-frequency vibration source and controlling the ultrasonic transmitter may involve controlling more than one device. Controlling the low-frequency vibration source may, in some implementations, involve causing the low-frequency vibration source to generate the first low-frequency vibrations in the plane of the outer surface and/or perpendicular to the plane of the outer surface. Controlling the low-frequency vibration source may, in some implementations, involve causing the low-frequency vibration source to generate at least one of a single frequency or multiple frequencies. Controlling the low-frequency vibration source may, in some implementations, involve causing the low-frequency vibration source to generate low-frequency vibrations intermittently or continuously.

Some methods may involve determining at least one feature quality metric. Some such methods may involve using the feature quality metric as a feedback signal for the low-frequency vibration source and controlling the low-frequency vibration source based, at least in part, on the feedback signal. Some such methods may involve determining whether at least one feature quality metric is below a feature quality metric threshold and, and, if it is determined that at least one feature quality metric is below a feature quality metric threshold, controlling the low-frequency vibration source for generation of second low-frequency vibrations having a higher amplitude than the amplitude of the first low-frequency vibrations.

As noted above, some methods involve controlling the low-frequency vibration source for generation of the first low-frequency vibrations during a first time interval and controlling the ultrasonic transmitter for transmission of the first ultrasonic waves during a second time interval that at least partially coincides with the first time interval. Some such methods may involve controlling the ultrasonic transmitter for a plurality of instances of ultrasonic wave transmission during the first time interval.

Some such implementations may involve capturing, via the ultrasonic receiver, a plurality of sets of fingerprint image data during the first time interval. Each of the sets of fingerprint image data may, in some instances, correspond to reflections from the target object of ultrasonic waves transmitted during different instances of ultrasonic wave transmission. Some such methods may involve extracting background features from each of the sets of fingerprint image data and distinguishing the background features from the fingerprint features.

Some methods may involve performing a coherent feature detection method that involves synchronizing times during which each of the sets of fingerprint image data are captured by the ultrasonic receiver with a period and a phase of the low-frequency vibrations. Some such methods may involve multiplying each set of fingerprint image data by a corresponding weighting factor of a plurality of weighting factors, to produce weighted fingerprint image data values. Each weighting factor of the plurality of weighting factors may, in some examples, correspond to a phase of the low-frequency vibrations.

Some such methods may involve summing the weighted fingerprint image data values to obtain a plurality of pixel-by-pixel correlations with the low-frequency vibrations. Some such methods may involve determining an absolute value of each of the pixel-by-pixel correlations, comparing each absolute value with a threshold value and producing a binarized mask based on a comparison of each absolute value with the threshold value. The binarized mask may, for example, indicate edges of one or more of the fingerprint features.

Some methods may involve performing a non-coherent feature detection method in which the times during which fingerprint images are captured are independent of a period and/or a phase of the low-frequency vibrations. Various examples are disclosed herein.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform one or more methods. According to some examples, the method(s) may correspond to control system functionality that is disclosed herein. Some such methods may be, or may include, authentication methods. Some methods may involve controlling an ultrasonic transmitter for transmission of first ultrasonic waves and controlling a low-frequency vibration source for generation of first low-frequency vibrations. Such methods may involve synchronizing the generation of the first low-frequency vibrations and the transmission of the first ultrasonic waves. Such methods may involve receiving ultrasonic receiver signals from an ultrasonic receiver. The ultrasonic receiver signals may include signals corresponding to reflections of the first ultrasonic waves from a target object in contact with an outer surface of an apparatus. Such methods may involve performing an authentication process based, at least in part, on the ultrasonic receiver signals.

According to some examples, synchronizing the generation of first low-frequency vibrations and the transmission of first ultrasonic waves may involve controlling the low-frequency vibration source for generation of the first low-frequency vibrations during a first time interval and controlling the ultrasonic transmitter for transmission of the first ultrasonic waves during a second time interval that is after the first time interval.

However, in some implementations, synchronizing the generation of first low-frequency vibrations and the transmission of first ultrasonic waves may involve controlling the low-frequency vibration source for generation of the first low-frequency vibrations during a first time interval and controlling the ultrasonic transmitter for transmission of the first ultrasonic waves during a second time interval that at least partially coincides with the first time interval. Some such implementations may involve detecting background noise in the ultrasonic receiver signals based, at least in part, on the first low-frequency vibrations.

In some examples, controlling the low-frequency vibration source may involve at least one of causing localized low-frequency vibration of only a portion of the apparatus or global low-frequency vibration of the entire apparatus. In some implementations, controlling the low-frequency vibration source and controlling the ultrasonic transmitter may involve controlling a single device, whereas in other implementations controlling the low-frequency vibration source and controlling the ultrasonic transmitter may involve controlling more than one device. Controlling the low-frequency vibration source may, in some implementations, involve causing the low-frequency vibration source to generate the first low-frequency vibrations in the plane of the outer surface and/or perpendicular to the plane of the outer surface. Controlling the low-frequency vibration source may, in some implementations, involve causing the low-frequency vibration source to generate at least one of a single frequency or multiple frequencies. Controlling the low-frequency vibration source may, in some implementations, involve causing the low-frequency vibration source to generate low-frequency vibrations intermittently or continuously.

Some methods may involve determining at least one feature quality metric. Some such methods may involve using the feature quality metric as a feedback signal for the low-frequency vibration source and controlling the low-frequency vibration source based, at least in part, on the feedback signal. Some such methods may involve determining whether at least one feature quality metric is below a feature quality metric threshold and, and, if it is determined that at least one feature quality metric is below a feature quality metric threshold, controlling the low-frequency vibration source for generation of second low-frequency vibrations having a higher amplitude than the amplitude of the first low-frequency vibrations.

As noted above, some methods involve controlling the low-frequency vibration source for generation of the first low-frequency vibrations during a first time interval and controlling the ultrasonic transmitter for transmission of the first ultrasonic waves during a second time interval that at least partially coincides with the first time interval. Some such methods may involve controlling the ultrasonic transmitter for a plurality of instances of ultrasonic wave transmission during the first time interval.

Some such implementations may involve capturing, via the ultrasonic receiver, a plurality of sets of fingerprint image data during the first time interval. Each of the sets of fingerprint image data may, in some instances, correspond to reflections from the target object of ultrasonic waves transmitted during different instances of ultrasonic wave transmission. Some such methods may involve extracting background features from each of the sets of fingerprint image data and distinguishing the background features from the fingerprint features.

Some methods may involve performing a coherent feature detection method that involves synchronizing times during which each of the sets of fingerprint image data are captured by the ultrasonic receiver with a period and a phase of the low-frequency vibrations. Some such methods may involve multiplying each set of fingerprint image data by a corresponding weighting factor of a plurality of weighting factors, to produce weighted fingerprint image data values. Each weighting factor of the plurality of weighting factors may, in some examples, correspond to a phase of the low-frequency vibrations.

Some such methods may involve summing the weighted fingerprint image data values to obtain a plurality of pixel-by-pixel correlations with the low-frequency vibrations. Some such methods may involve determining an absolute value of each of the pixel-by-pixel correlations, comparing each absolute value with a threshold value and producing a binarized mask based on a comparison of each absolute value with the threshold value. The binarized mask may, for example, indicate edges of one or more of the fingerprint features.

Some methods may involve performing a non-coherent feature detection method in which the times during which fingerprint images are captured are independent of a period and/or a phase of the low-frequency vibrations. Various examples are disclosed herein.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
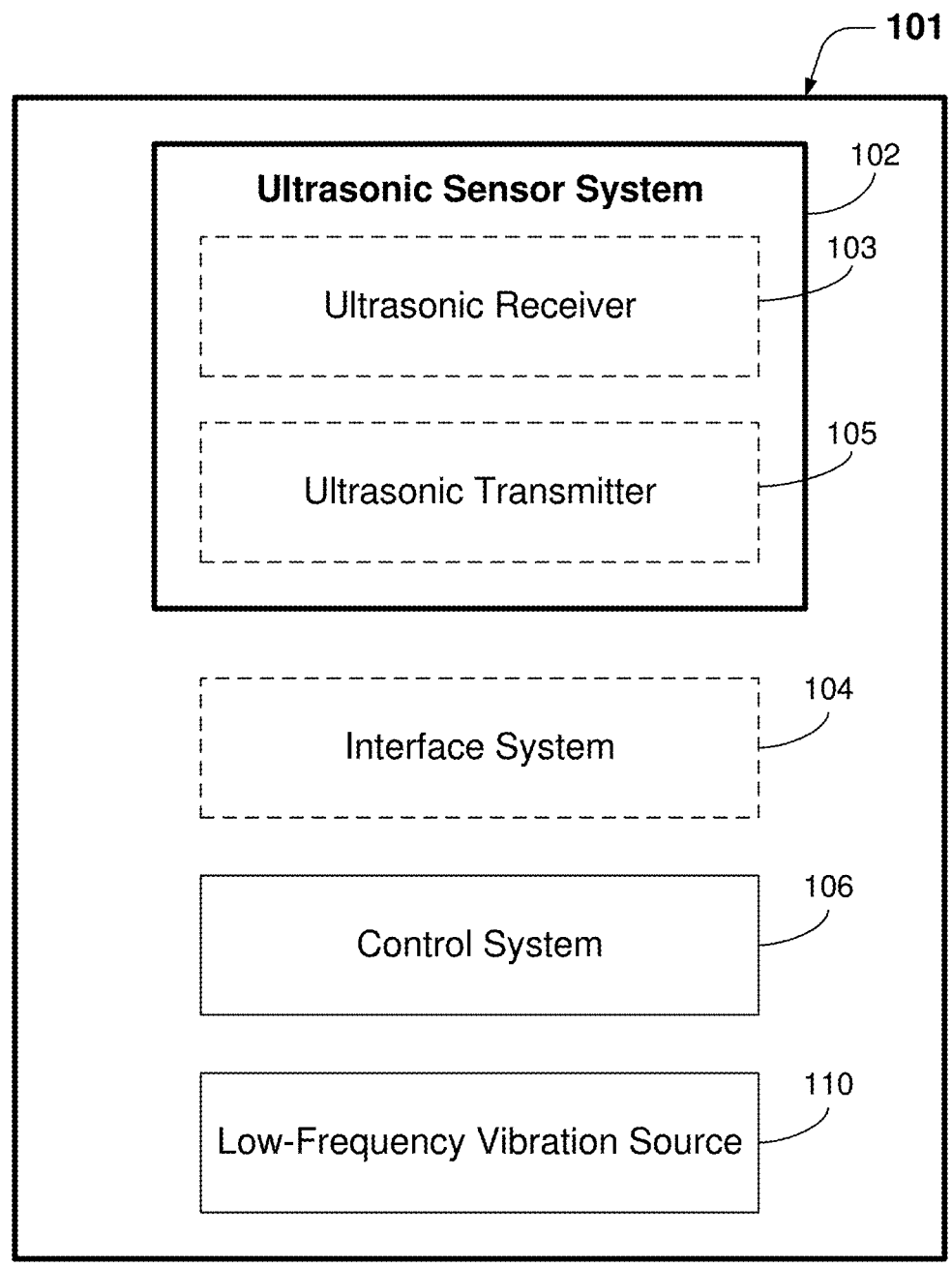
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Poor coupling of the finger to the platen of an ultrasonic fingerprint sensor is a common problem. (As used herein, the term "finger" can refer to any digit, including a thumb.) Poor coupling can occur when the finger is dry and/or when low finger pressure is applied. In some implementations, an apparatus may include an ultrasonic sensor system, a low-frequency vibration source and a control system. According to some examples, the ultrasonic sensor system may include an ultrasonic receiver and an ultrasonic transmitter configured for transmitting ultrasonic waves in the range of 1 MHz to 30 MHz. However, other implementations may be configured for transmitting ultrasonic waves in other frequency ranges, such as frequencies below 1 MHz and/or frequencies above 30 MHz. In some implementations, the low-frequency vibration source may be configured for generating low-frequency vibrations in the range of 5 Hz to 2000 Hz. However, other implementations may be configured for generating low-frequency vibrations in other frequency ranges, such as frequencies below 5 Hz and/or frequencies above 2000 Hz. In some implementations, the control system may be configured for synchronizing the generation of the first low-frequency vibrations and the transmission of the first ultrasonic waves.

Particular implementations of the subject matter described in this disclosure may be implemented to realize one or more of the following potential advantages. The low-frequency vibrations may improve coupling in various ways. For example, the low-frequency vibrations may cause a user to press harder on the platen, may cause pores to exude more sweat and/or oil, may spread out oil and/or sweat to better couple a finger to the platen, etc. In some instances, the low-frequency vibrations may "hammer down" fingerprint ridges. Some implementations leverage a low-frequency vibration source (such as a haptic device or a speaker like those in existing cell phones) to improve coupling between a finger and a platen of a fingerprint sensing system.

FIG. 1 is a block diagram that shows example components of an apparatus according to some disclosed implementations. In this example, the apparatus 101 includes an ultrasonic sensor system 102, a control system 106 and a low-frequency vibration source 110. Some implementations of the apparatus 101 may include an interface system 104.

In some implementations, the low-frequency vibration source 110 may be configured for generating low-frequency vibrations in the range of 5 Hz to 2000 Hz. In some examples, the low-frequency vibration source 110 may be, or may include, a piezoelectric actuator, an eccentric rotating mass and/or a linear resonant actuator. In some implementations, the low-frequency vibration source 110 may be, or may include, a haptic device or a speaker like those in existing cell phones. In some implementations, the speaker may be the whole display panel or the enclosure of the cell phone.

In some examples, the low-frequency vibration source may be configured to cause localized low-frequency vibration of only a portion of the apparatus. For example, the vibration may be caused by a buzzer that is integrated into a fingerprint sensor, while being physically isolated from the phone enclosure. In other implementations, the low-frequency vibration source may be configured to cause global low-frequency vibration of the entire apparatus, or of substantially the entire apparatus. For example, the vibration can be introduced by a buzzer physically integrated to the phone enclosure.

In some examples, the control system may be configured for controlling the low-frequency vibration source to generate a single frequency. In other examples, the control system may be configured for controlling the low-frequency vibration source to generate multiple frequencies, e.g., to produce a frequency-modulated waveform. In one such example, the frequency-modulated waveform may be a "chirp," which is a signal in which the frequency increases (up-chirp) or decreases (down-chirp) with time. In some such examples, the highest frequency of the chirp may be in the kHz range. In some instances, the control system may be configured for controlling the low-frequency vibration source to generate low-frequency vibrations continuously, e.g., during a time interval. In other examples the control system may be configured for controlling the low-frequency vibration source to generate low-frequency vibrations intermittently, e.g., during a time interval. The time interval may, for example, be the time interval 404 that is described below with reference to FIG. 4.

Although the ultrasonic sensor system 102 and the low-frequency vibration source 110 are shown as separate blocks in FIG. 1, according to some examples, the ultrasonic sensor system 102 may be configured for functioning as a low-frequency vibration source. In some such examples, a single device may include the low-frequency vibration source 110 and the ultrasonic transmitter 105.

In some examples, as suggested by the dashed lines within the ultrasonic sensor system 102, the ultrasonic sensor system 102 may include an ultrasonic receiver 103 and a separate ultrasonic transmitter 105. In some such examples, the ultrasonic transmitter 105 may include an ultrasonic plane-wave generator, such as those described below.

However, various examples of ultrasonic sensor systems 102 are disclosed herein, some of which may include a separate ultrasonic transmitter 105 and some of which may not. Although shown as separate elements in FIG. 1, in some implementations the ultrasonic receiver 103 and the ultrasonic transmitter 105 may be combined in an ultrasonic transceiver system. For example, in some implementations, the ultrasonic sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. In some implementations that include a piezoelectric layer, other piezoelectric materials may be used in the piezoelectric layer, such as aluminum nitride (AlN) or lead zirconate titanate (PZT). The ultrasonic sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

The ultrasonic sensor system 102 and the low-frequency vibration source 110 may, in some instances, be mechanically coupled. In some examples the ultrasonic sensor system 102 and the low-frequency vibration source 110 may be indirectly coupled. For example, the ultrasonic sensor system 102 and the low-frequency vibration source 110 each may be coupled to a portion of the apparatus 101. In some such examples, the ultrasonic sensor system 102 and the low-frequency vibration source 110 each may be coupled to a portion of the control system. However, in some examples the ultrasonic sensor system 102 and the low-frequency vibration source 110 may be directly coupled to one another.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1. The control system 106 may be configured for receiving and processing data from the ultrasonic sensor system 102, e.g., from the ultrasonic receiver 103. If the apparatus 101 includes a separate ultrasonic transmitter 105, the control system 106 may be configured for controlling the ultrasonic transmitter 105, e.g., as disclosed elsewhere herein. In some implementations, functionality of the control system 106 may be partitioned between one or more controllers or processors, such as between a dedicated sensor controller and an applications processor of a mobile device. Some examples are described below.

Some implementations of the apparatus 101 may include an interface system 104. In some examples, the interface system may include a wireless interface system. In some implementations, the interface system may include a user interface system, one or more network interfaces, one or more interfaces between the control system 106 and a memory system, and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101. In some such examples, the interface system 104 may be configured to provide communication between the control system 106 and the ultrasonic sensor system 102, and between the control system 106 and the low-frequency vibration source 110. According to some such examples, the interface system 104 may couple at least a portion of the control system 106 to the ultrasonic sensor system 102 and the low-frequency vibration source 110, e.g., via electrically conducting material (e.g., via conductive metal wires or traces, such as printed circuit board (PCB) traces. The PCB may, for example, be rigid or semi-rigid, or be a flexible printed circuit. If the apparatus 101 includes an ultrasonic transmitter 105 that is separate from the ultrasonic receiver 103, the interface system 104 may be configured to provide communication between at least a portion of the control system 106 and the ultrasonic transmitter 105. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a serial peripheral interface (SPI)). In some implementations, the apparatus 101 may include a memory system. The interface system 104 may, in some examples, include at least one interface between the control system 106 and a memory system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, a smart watch, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2:
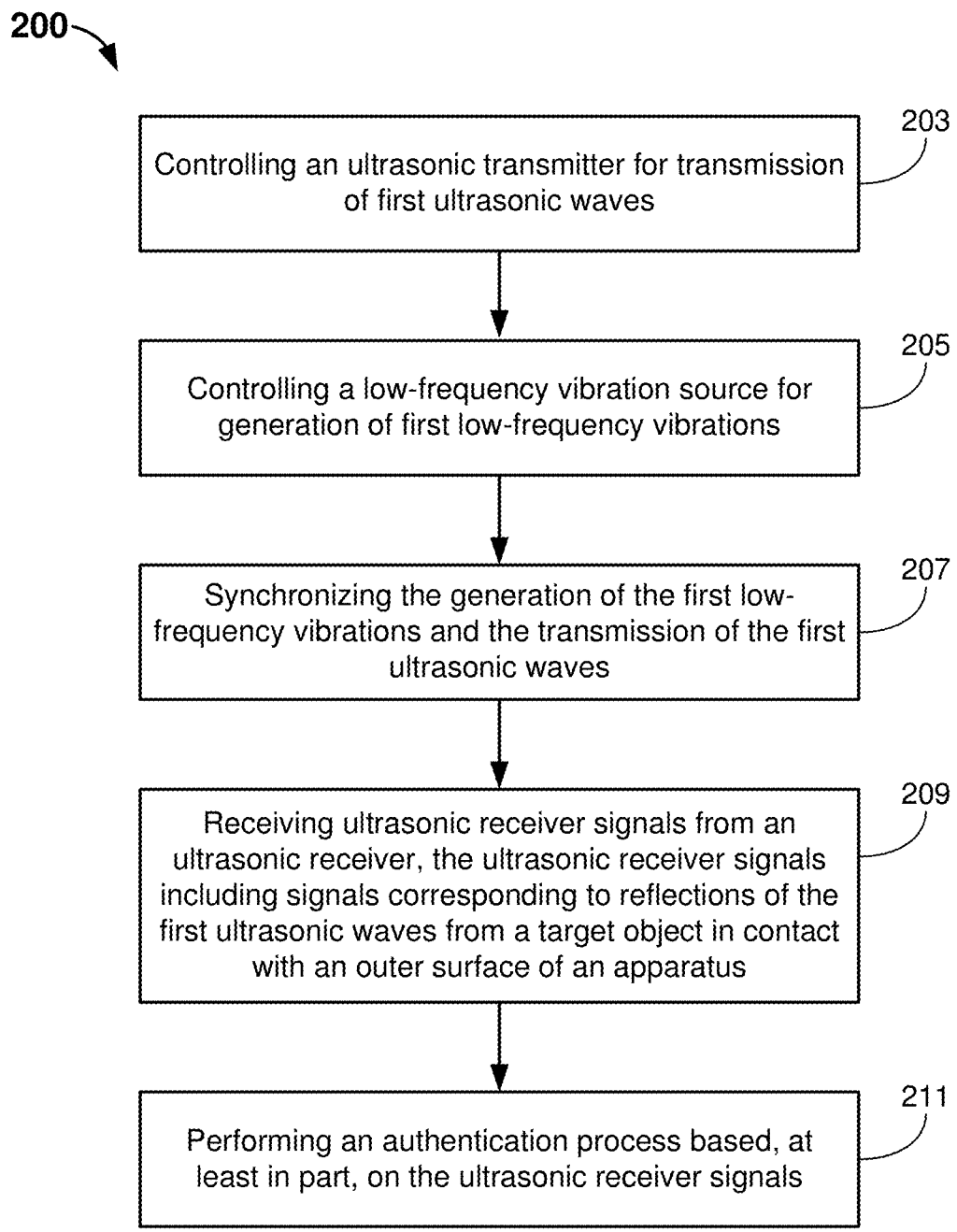
FIG. 2 is a flow diagram that provides example blocks of some methods disclosed herein

FIG. 2 is a flow diagram that provides example blocks of some methods disclosed herein. The blocks of FIG. 2 may, for example, be performed by the apparatus 101 of FIG. 1 or by a similar apparatus. As with other methods disclosed herein, the method 200 outlined in FIG. 2 may include more or fewer blocks than indicated. Moreover, the blocks of methods disclosed herein are not necessarily performed in the order indicated. In some examples, some blocks of methods disclosed herein may be performed concurrently.

In this example, block 203 involves controlling an ultrasonic sensor system, such as the ultrasonic sensor system 102 of FIG. 1, to transmit first ultrasonic waves. In some examples, block 205 may involve controlling the ultrasonic sensor system to transmit ultrasonic waves in the range of 1 MHz to 30 MHz. For example, an ultrasonic transmitter may be controlled for transmission of the first ultrasonic waves.

According to this implementation, block 205 involves controlling a low-frequency vibration source to generate first low-frequency vibrations. In some examples, block 205 may involve controlling an ultrasonic sensor system, such as the ultrasonic sensor system 102 of FIG. 1, to generate the first low-frequency vibrations. Alternatively, or additionally, block 205 may involve controlling a separate low-frequency vibration source to generate the first low-frequency vibrations. In some examples, block 205 may involve causing the low-frequency vibration source to generate the first low-frequency vibrations in the plane of an outer surface of the apparatus that includes the low-frequency vibration source. Alternatively, or additionally, block 205 may involve causing the low-frequency vibration source to generate the first low-frequency vibrations perpendicular to the plane of the outer surface.

Some implementations of method 200 may involve a determination of whether or not to actuate the low-frequency vibration source. According to some such implementations, the determination may be based, at least in part, on an estimation of the contact quality of a finger or other target object that is in contact with a surface of the apparatus (e.g., a platen, a cover glass of a display, etc.). According to some such examples, method 200 may involve determining a contact quality metric. The contact quality metric may correspond to one or more image quality metrics and/or feature quality metrics.

One example of an image quality metric is the ridge/valley signal-to-noise ratio (SNR). The ridge/valley SNR is unitless and may, for example, be defined as the average of a ridge/valley delta divided by valley noise. Another example of an image quality metric is contrast. Contrast may, for example, be measured in units of grey level, which may be defined as the primary 1 p/mm (line pairs per millimeter) signal amplitude averaged over an entire image. Another example of an image quality metric is the ridge/valley gray transition, which is unitless. The ridge/valley gray transition may be defined as the delta of grey level across a ridge/valley boundary divided by the valley noise.

Global ridge flow coherence is one example of a feature quality metric. Global ridge flow coherence may be defined as a $2^{nd}$ degree polynomial fit of the vector field to the row and column coordinates. Orientation coherence is another example of a feature quality metric. Orientation coherence corresponds with smooth ridge flow changes. Orientation coherence may be defined as 1 minus the average column orientation delta. Another feature quality metric that may be used in some implementations is the fingerprint curvature coefficient, which may be defined as the summation of the field polynomial coefficient divided by 2. In some examples, method 200 may involve a determination to actuate the low-frequency vibration source if the contact quality metric is at or below a contact quality metric threshold. The contact quality metric threshold may or may not be predetermined, based upon the particular implementation.

According to this example, block 207 involves synchronizing the generation of the first low-frequency vibrations and the transmission of the first ultrasonic waves. In some instances, block 207 may involve controlling the low-frequency vibration source for generation of the first low-frequency vibrations during a first time interval and controlling the ultrasonic transmitter for transmission of the first ultrasonic waves during a second time interval that is after the first time interval. According to some examples, block 207 may involve controlling the low-frequency vibration source for generation of the first low-frequency vibrations during a first time interval and controlling the ultrasonic transmitter for transmission of the first ultrasonic waves during a second time interval that at least partially coincides with the first time interval. Some examples are described below.

In this example, block 209 involves receiving ultrasonic receiver signals from an ultrasonic receiver. According to this example, the ultrasonic receiver signals include signals corresponding to reflections of the first ultrasonic waves from a target object in contact with an outer surface of an apparatus that includes the ultrasonic transmitter and the ultrasonic receiver. Some implementations may involve processing the received ultrasonic receiver signals, e.g., prior to the operations of block 211. According to some such examples, a control system may be configured to apply a high-pass filter to the ultrasonic receiver signals, e.g., a first-order, second-order or third-order high-pass filter. The high-pass filter may, in one non-limiting example, pass frequencies greater than 10 kHz. In some such examples, a control system may be configured to apply a bandpass filter to the ultrasonic receiver signals. According to some such implementations, the bandpass filter may pass frequencies in the range of 10 kHz to 20 kHz.

According to this example, block 211 involves performing an authentication process based, at least in part, on the ultrasonic receiver signals received in block 209. In some instances, block 211 may involve obtaining fingerprint image data corresponding to the signals. As used herein, the term "fingerprint image data" may refer generally to data obtained from, or data based on signals obtained from, an ultrasonic receiver. In some instances, the fingerprint image data may correspond, at least in part, to a target object such as a finger that may include a fingerprint. The fingerprint image data may or may not be presented in a form that is recognizable to a human being as being an image. For example, the fingerprint image data may be, or may include, a data structure in which numerical values are arranged and/or stored. The numerical values may, in some examples, correspond to signals received from an ultrasonic sensor system, an optical sensor system, a capacitive sensor system, etc. In some examples, the fingerprint image data may correspond to signals received from a sensor system during a time window. In some instances, the fingerprint image data may correspond to signals received from a particular area, such as a fingerprint contact area. In some instances, the fingerprint image data may be, or may include, data that has been aggregated and/or processed in some manner after having been acquired from a sensor system. Some examples of such processing are disclosed herein.

In some examples, block 211 may involve extracting features from the ultrasonic receiver signals. The authentication process may be based, at least in part, on the features. According to some examples, the features may be fingerprint features, such as the locations, orientations and/or types of fingerprint minutiae. In some such examples, the fingerprint image data may include indications of one or more fingerprint features detected in at least a portion of the signals from the sensor system (such as an ultrasonic sensor system). The fingerprint features may include one or more fingerprint ridge features and one or more fingerprint valley features. The fingerprint features may, for example, be detected by a control system such as the control system 106 of FIG. 1.

Signals indicating fingerprint ridge features may generally be obtained from sensor pixels of the ultrasonic sensor system that are responding to ultrasonic waves that have been reflected from platen/fingerprint ridge interfaces. Signals indicating fingerprint valley features may generally be obtained from sensor pixels that are responding to ultrasonic waves that have been reflected from platen/fingerprint valley interfaces. The reflections from a platen/fingerprint valley interface will generally be reflections from a platen/air interface, whereas the reflections from a platen/fingerprint ridge interface will generally be reflections from a platen/skin interface, corresponding to areas in which fingerprint ridges are in contact with a platen.

According to some implementations, method 200 may involve additional processes that depend on the outcome of the authentication process of block 211. For example, if the authentication process concludes successfully, a control system may allow access to a device and/or to a secure area. In some such instances, a control system may unlock a mobile device, a laptop computer, a door, an automobile, or another device.

In some examples, a control system may be configured for determining at least one feature quality metric. According to some such examples, the control system may be configured for using the feature quality metric as a feedback signal for the low-frequency vibration source and controlling the low-frequency vibration source based, at least in part, on the feedback signal. In some instances, the control system may be configured for determining whether the at least one feature quality metric is below a feature quality metric threshold and, if it is determined that the at least one feature quality metric is below a feature quality metric threshold, controlling the low-frequency vibration source for generation of second low-frequency vibrations having a higher amplitude than the amplitude of the first low-frequency vibrations.

Figure 3:
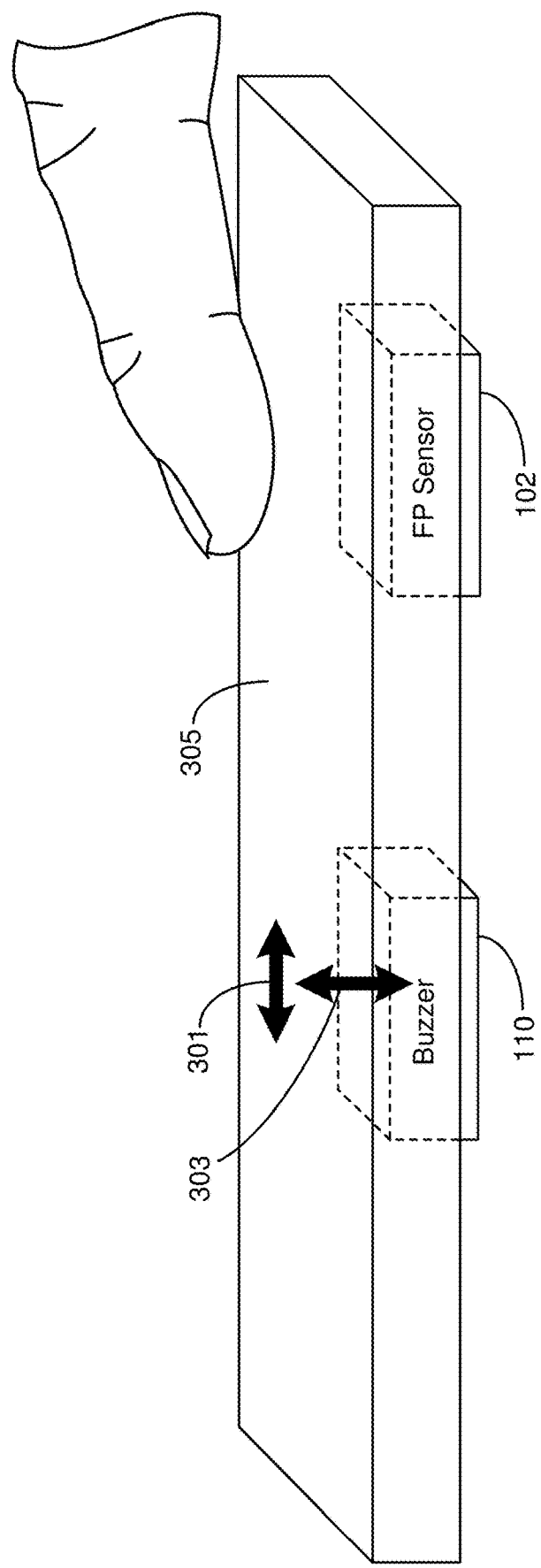
FIG. 3 shows example components of an apparatus according to some disclosed implementations.

FIG. 3 shows example components of an apparatus according to some disclosed implementations. In the example shown in FIG. 3, the low-frequency vibration source 110 is a haptic device. According to this example, the fingerprint (FP) sensor system is an ultrasonic sensor system 102. In some instances, the low-frequency vibration source 110 may include an eccentric rotating mass or a linear resonant actuator. In other instances, the low-frequency vibration source 110 may include a piezoelectric actuator, such as a piezoelectric beam or a piezoelectric disk. According to some examples, the ultrasonic sensor system 102 may include the low-frequency vibration source 110.

In some examples, the low-frequency vibration source 110 may connect directly to the ultrasonic sensor system 102, or to a control system that is configured to control the ultrasonic sensor system 102. In some instances, the low-frequency vibration source 110 may connect to the ultrasonic sensor system 102 (or to a control system that is configured to control the ultrasonic sensor system 102) through a shared structure (such as an organic light-emitting diode (OLED) panel) to the ultrasonic sensor system 102. In some examples, the control system may be configured for causing the low-frequency vibration source to generate the first low-frequency vibrations in the plane of the outer surface 305, as indicated by the arrows 301. Alternatively, or additionally, the control system may be configured for causing the low-frequency vibration source to generate the first low-frequency vibrations perpendicular to the plane of the outer surface 305, as indicated by the arrows 303.

Although the low-frequency vibration source 110 is labeled a "buzzer" in FIG. 3, at least some of the frequencies emitted by the low-frequency vibration source 110 may, in some instances, be below the range of human hearing. However, in other examples the low-frequency vibration source 110 may be configured to generate vibrations in a frequency range that is known to be readily detectable by human mechanoreceptors, e.g., in the range of 400 Hz to 1000 Hz.

Figure 4:
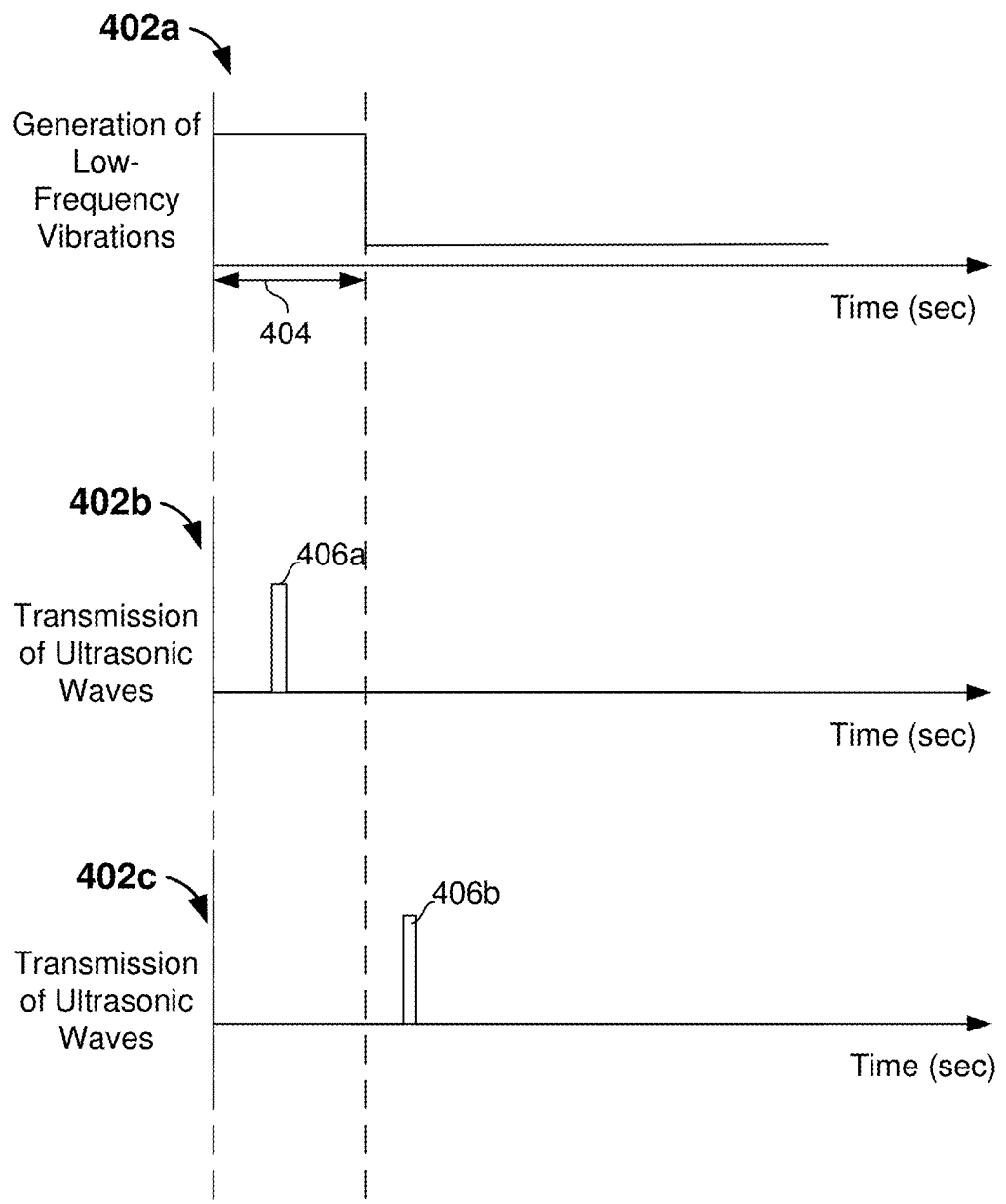
FIG. 4 shows examples of synchronizing the generation of low-frequency vibrations and the transmission of ultrasonic waves.

FIG. 4 shows examples of synchronizing the generation of low-frequency vibrations and the transmission of ultrasonic waves. In this example, graph 402a shows an example of controlling a low-frequency vibration source for generation of the low-frequency vibrations during a time interval 404. Graph 402a provides an example of block 205 of FIG. 2. In some examples the low-frequency vibrations may be generated continuously during the time interval 404, whereas in other examples the low-frequency vibrations may be generated intermittently during the time interval 404.

In this example, graph 402b provides an example of block 203 of FIG. 2. According to this example, graph 402b shows an example of controlling an ultrasonic transmitter for transmission of ultrasonic waves during a time interval 406a that at least partially coincides with the time interval 404. In some such examples, ultrasonic waves reflected from a target object may be received during a subsequent time interval that at least partially coincides with the time interval 404. However, in other examples ultrasonic waves reflected from a target object may be received during a time interval that does not overlap with the time interval 404.

In this example, graph 402c provides an alternative example of block 203 of FIG. 2. According to this example, graph 402c shows an example of controlling an ultrasonic transmitter for transmission of ultrasonic waves during a time interval 406b that does not coincide with the time interval 404, but instead if after the time interval 404.

Some disclosed implementations may involve additional image processing for instances in which ultrasonic waves are transmitted and/or received during a time interval that at least partially coincides with a time interval during which low-frequency vibrations are being generated. Some such implementations may involve detecting background noise in the ultrasonic receiver signals based, at least in part, on the low-frequency vibrations. For example, features which are modulated by the low-frequency vibrations may be actual fingerprint features, whereas features which are invariant to the low-frequency vibrations may be background features.

In some instances, such background features may arise from the mechanical construction of a fingerprint sensor and/or from an associated process of attaching the fingerprint sensor to other parts of a device, e.g., attachment to a platen, attachment to a display device (such as an OLED display). For example, the attachment process may involve lamination. These background features may change with temperature and aging of the sensor. The presence of such background features can reduce the quality of a fingerprint image, thereby reducing the accuracy of an authentication process. In some instances, the presence of background features may increase the false rejection rate and/or the false acceptance rate of an authentication process. Eliminating at least some background features can improve the signal-to-noise ratio of fingerprint image data. Therefore, although such background features may be static and non-random, background features may sometimes be referred to herein as "background noise."

Figure 5:
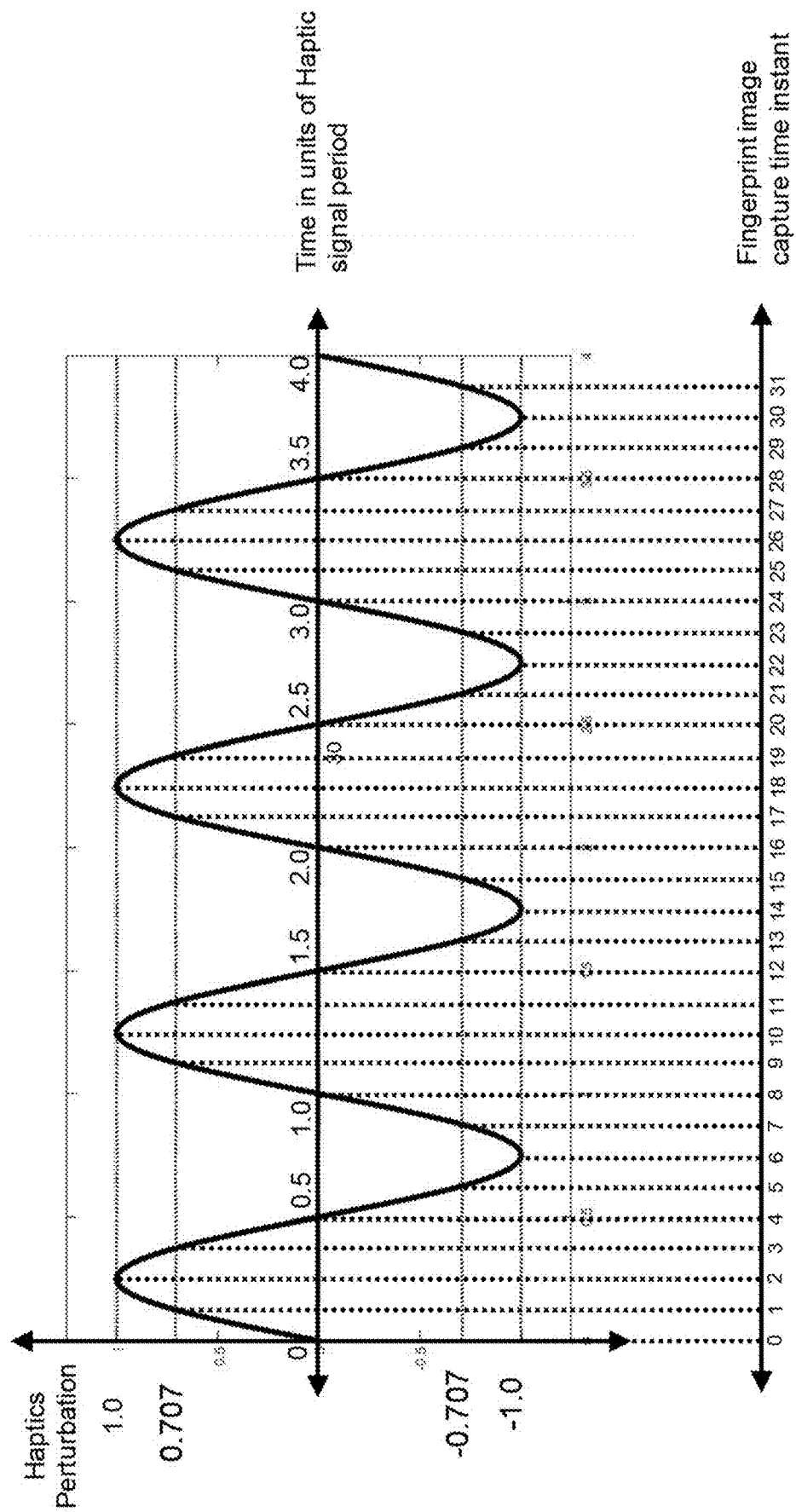
FIG. 5 shows an example of a coherent detection method.

FIG. 5 shows an example of a coherent detection method. In this example, the times during which fingerprint images are captured by an ultrasonic receiver (which may be referred to herein as "acquisition times" or "sample times") are synchronized with the period and phase of the low-frequency vibrations. In this example and in subsequent examples, the low-frequency vibrations are referred to as a "haptic perturbation," a "haptic signal" or a "haptic perturbation signal." In some such examples, the low-frequency vibrations are actually produced by a haptic device. However, in other examples, the low-frequency vibrations described as a haptic perturbation, a haptic perturbation signal, etc., are not produced by a haptic device. The same principles discussed below apply for implementations in which the low-frequency vibrations are produced by another type of device.

In the example shown in FIG. 5, the haptic perturbation signal is shown as a sinusoidal waveform for illustrative purposes. However, in alternative examples the haptic perturbation signal may be a more complex signal, such as a modulated signal. According to this example, eight sets of ultrasonic receiver signals are captured for every period of the haptic perturbation, at phases 0, 45, 90, 135, 180, 225, 270 and 315 degrees.

Figure 6:
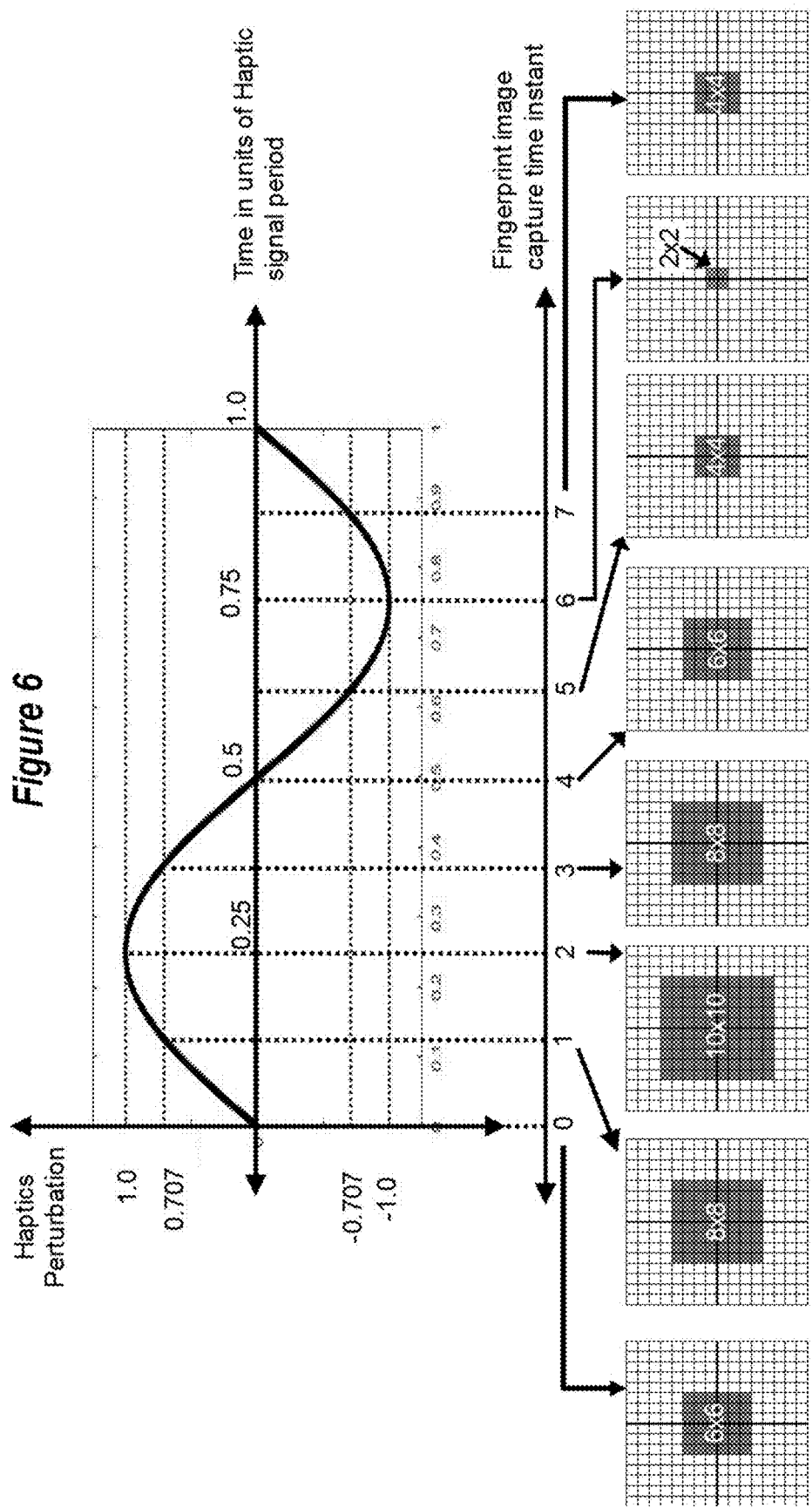
FIG. 6 shows an example of the perturbation of a fingerprint feature over one period of the haptic perturbation signal.

FIG. 6 shows an example of the perturbation of a fingerprint feature over one period of the haptic perturbation signal. To simplify the illustration, the fingerprint sensor is represented as a 16-pixel by 16-pixel square and the fingerprint feature is represented as a square-shaped pattern. In this example, the un-perturbed fingerprint feature occupies a 6-pixel by 6-pixel square. According to this example, the fingerprint feature is spatially modulated by the haptic perturbation signal. When the haptic signal is applied, the area occupied by the fingerprint feature grows to as large as a 10-pixel by 10-pixel and shrinks to as small an area as 2-pixel by 2-pixel. In this example, the spatial increase and decrease in size are correlated with the phase of the haptic signal.

Figure 7:
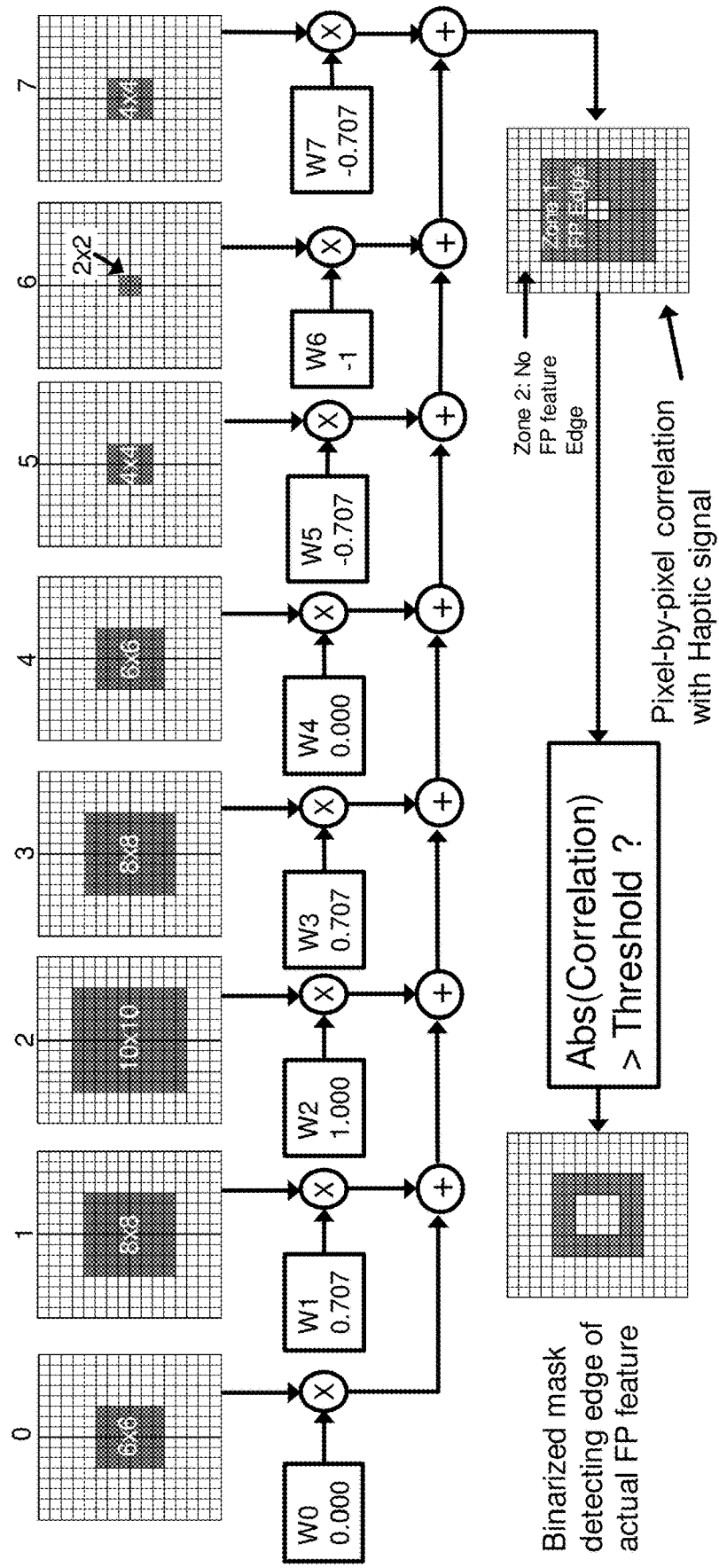
FIG. 7 shows an example of a method for detecting an edge of a fingerprint feature.

FIG. 7 shows an example of a method for detecting an edge of a fingerprint feature. In this example, eight sets of fingerprint image data (numbered 0 through 7) were acquired at the same phases of the haptic signal shown in FIG. 6. In this example, each sample of fingerprint image data is multiplied by an appropriate weighting factor. In this implementation, each pixel value in sample 0 of the fingerprint image data is multiplied by weighting factor W0, each pixel value in sample 1 of the fingerprint image data is multiplied by weighting factor W1, and so on. According to some examples, each weighting factor may correspond to a phase of the haptic signal. In some such examples, when the haptic signal is a sinusoidal signal, the weighting factor may be a sine or cosine of the phase index. According to this example, the weighting factor is a sine of the phase corresponding to the index.

In this implementation, the weighted fingerprint image data values are then summed to obtain a pixel-by-pixel correlation with the haptic signal. This absolute value of each pixel correlation with the haptic signal is then compared with a threshold value. The output of this comparison is a binarized mask, which indicates where the edges of the actual fingerprint features are in the original fingerprint image data. An absolute value operation is performed because, depending on the mechanical construction of the fingerprint sensor and platen and the associated haptic signal, the correlation may be positive or negative.

The example shown in FIG. 7 indicates a summation over the various phases in one haptic waveform period. However, in some implementations the summation may be performed over several haptic waveform periods in order to increase the accuracy of the edge-detection process.

Figure 8:
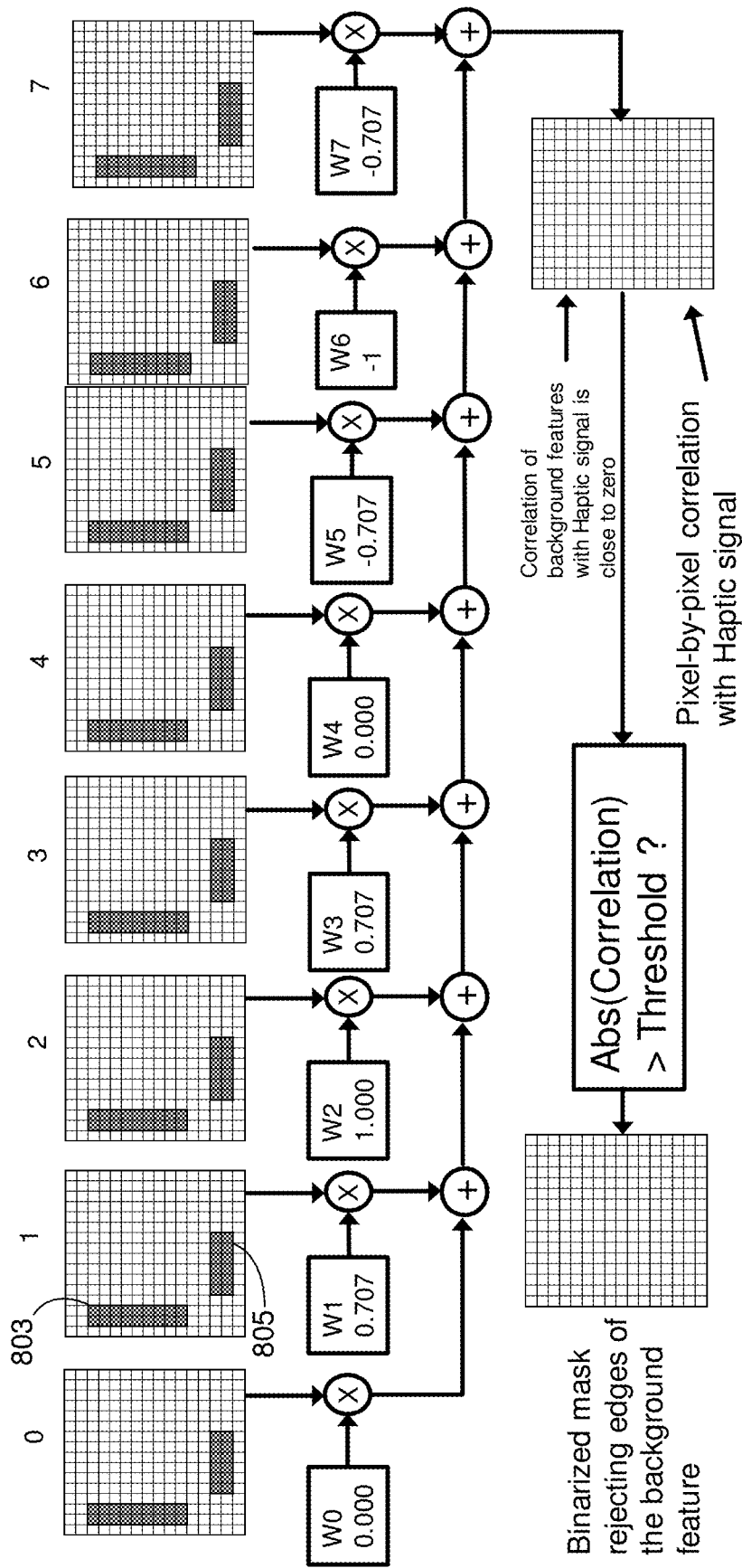
FIG. 8 shows an example of using a binarized mask to reject background features.

FIG. 8 shows an example of using a binarized mask to reject background features. In many instances, fingerprint background features do not change when the haptic signal is applied. For example, the fingerprint image data samples 0 through 7 in FIG. 8 include background features 803 and 805 that do not change with the various phases of the haptic signal. The pixel-by-pixel correlation of the background features with the haptic signal that is calculated from the weighted sum of the fingerprint image data samples 0 through 7 is therefore ideally zero and is in practice very low. In some instances, the correlation may be at the noise level of the system. Accordingly, in this example, when the binary threshold comparison is performed on the pixel-by-pixel correlation, the binarized mask does not indicate any edges. Therefore, the background features 803 and 805 are rejected.

In one example of the process of FIG. 8, we assume an ideal case in which there is no noise. According to one such example, the pixel levels are 8-bit signed values, e.g., taking integer values between −128 and 127, inclusive. For example, a pixel value of −128 may represent white, while a pixel value of 127 may represent black. In this example, suppose that the background features 803 and 805 have pixel values of 64, whereas the remaining pixels have a value=0, which represents the middle of the grey scale range. According to this example, for the pixels within the background feature, upon performing the weighted summation operation, using weights W0 through W7, one can see that the output will be 64*0+64*0.707+64*1+64*0.707+64*0+64*(−0.707)+64*(−1)+64*(−0.707)=0. For the remaining pixels, upon performing the weighted summation operation, using weights W0 through W7, one can see that the output will be 0*0+0*0.707+0*1+0*0.707+0*0+0*(−0.707)+0*(−1)+0*(−0.707)=0. This clearly indicates that the weighted summation rejects the background features, because all the pixels in the entire image are at 0, which is the middle of the grey scale range in this example.

In another example of the process of FIG. 8, we assume that the system has additive random noise that takes the value of either −1, 0 or 1 least significant bit (LSB). As with the previous example, the pixel levels in this example are 8-bit signed values. Because this noise is uncorrelated with the background features, all pixels (both background and non-background) will have the similar weighted output values. Both the pixels within the background features and pixels not within the background features will have the same noise levels, which are at the system noise floor.

For example, this random noise for a particular pixel could be the sequence [−1, 0, 0, −1, 1, −1, −1, −1]. The weighted average of this noise sequence applied to one pixel could then be −1*0+0*0.707+0*1+(−1)*0.707+1*0+(−1)* (−0.707)+(−1)*(−0.707)+(−1)*(−0.707)=1.414, which is rounded to 1 in an 8-bit operation. Suppose further that the random noise for a second pixel is the sequence [0, 1, 0, −1, 1, 1, 0, −1]. The weighted average of this noise sequence applied to the second pixel could then be =0*0+1* 0.707+0*1+(−1)*0.707+1*0+1*(−0.707)+0*(−0.707)+ (−1)*(−0.707)=2.121, which is rounded to 2 in an 8-bit operation.

Figure 9:
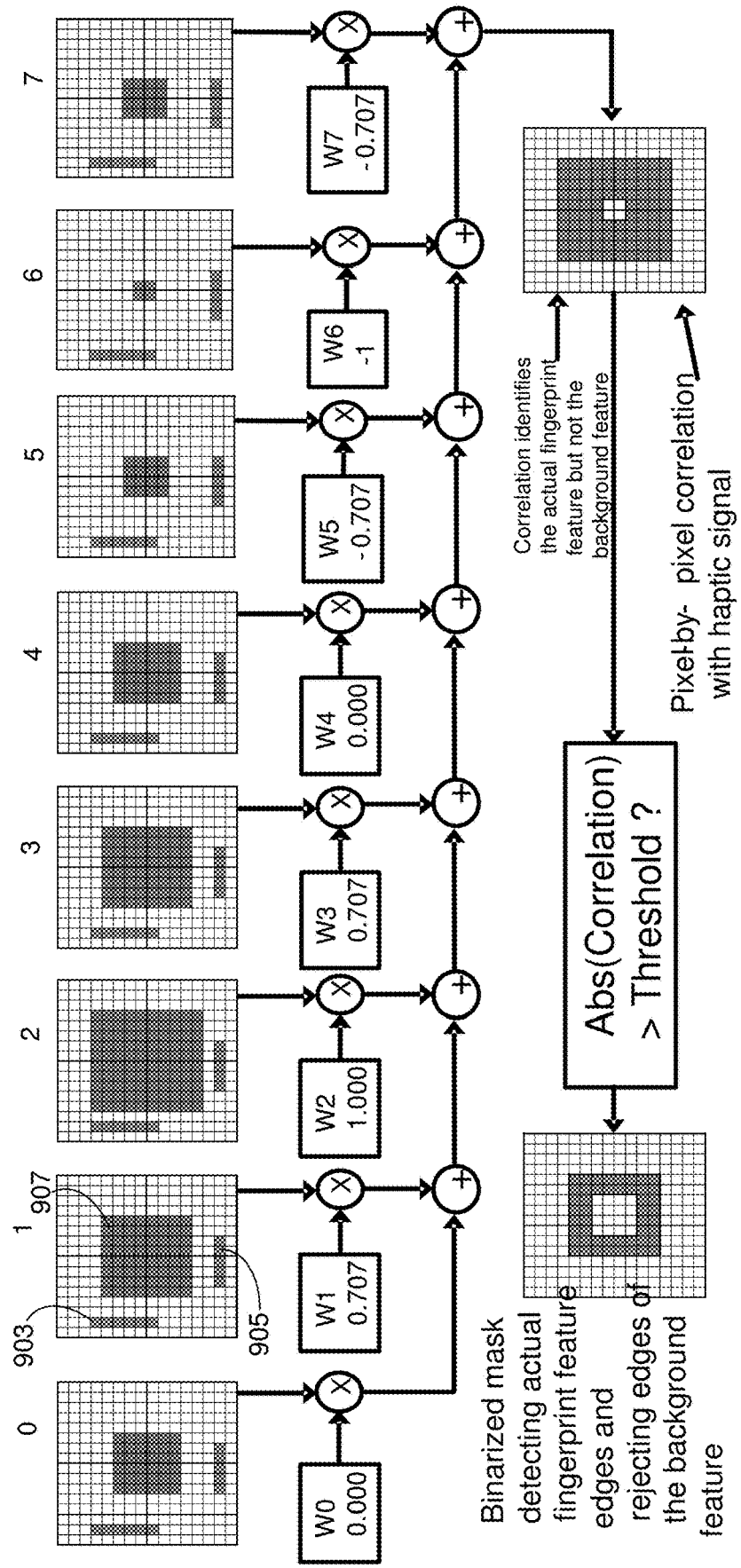
FIG. 9 shows another example of using a binarized mask to reject background features.

FIG. 9 shows another example of using a binarized mask to reject background features. In this example, the fingerprint image data samples 0 through 7 include background features 903 and 905 that do not change with the various phases of the haptic signal. According to this example, the fingerprint image data samples 0 through 7 also include a fingerprint feature 907 that does change with the various phases of the haptic signal. When actual fingerprint features and background features are both present in the fingerprint image data, as in this example, the pixel-by-pixel correlation as calculated by the weighted sum of the individual fingerprint image data samples over the phases of the haptic signal identifies the actual fingerprint feature 907 but rejects the background features 903 and 905. The resultant binarized mask, as shown in FIG. 9, detects only the edges of the actual fingerprint feature 907 but rejects the edges of the background features 903 and 905.

Figure 10:
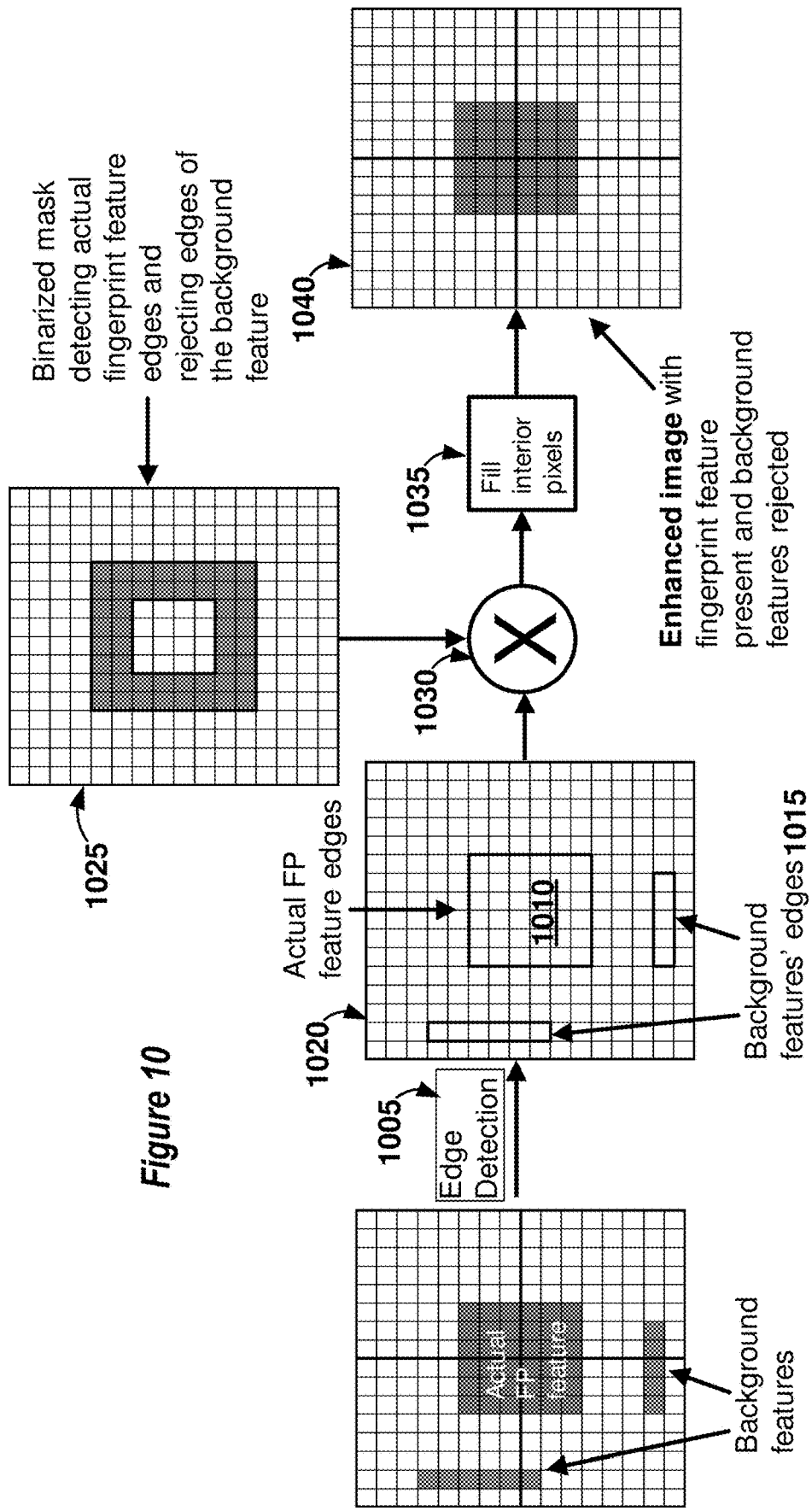
FIG. 10 provides an example of producing enhanced fingerprint image data.

FIG. 10 provides an example of producing enhanced fingerprint image data. According to this example, the edges of the original image features are identified in block 1005, e.g., as described above with reference to FIGS. 7-9. Edges, including the actual fingerprint image feature edges and background feature edges, may be detected by mathematical methods for identifying areas or regions of the image at which the image pixel values have a sharp change. For example, such mathematical methods may include gradient operators which estimate the derivative of the image pixel values. Regions that have a high gradient may be designated as image edges. These include both the actual fingerprint features 1010 and background feature edges 1015. This results in the "initial edge image" 1020.

The binarized mask 1025 may be determined before, after or in parallel with the creation of the initial edge image 1020. The binarized mask 1025 may, for example, be as described above with reference to FIGS. 7-9. According to this example, in process 1030 the initial edge image 1020 is multiplied pixel-by-pixel with the binarized mask 1025. Applying the binarized mask 1025 in process 1030 detects the actual fingerprint feature's edges and rejects the edges of the background features.

According to this example, the interior pixels of the actual fingerprint features' edges are filled, in block 1035, such as by a to produce an enhanced fingerprint image 1040. Block 1035 may, for example, involve applying a 4-connected boundary fill algorithm or an 8-connected boundary fill algorithm. The enhanced fingerprint image 1040 has a higher image quality, as compared to that of the individual fingerprint image samples (e.g., as compared to the quality of fingerprint image samples 0 through 7 described above). The image quality may, for example, be quantified according to one or more image quality metrics, such as those disclosed elsewhere herein. Producing an enhanced fingerprint image 1040 can improve the performance of a fingerprint sensor, e.g., can reduce the false rejection rate and/or the false acceptance rate of the fingerprint sensor.

FIGS. 6, 7, 9 and 10 illustrated instances in which the haptic signal caused enlargement or compression of the actual fingerprint features. Depending on the mechanical construction of the fingerprint sensor and associated platen, and depending on the displacement direction and/or rotation caused by the applied low-frequency vibrations, other spatial modulation of the fingerprint features may occur.

Figure 11A:
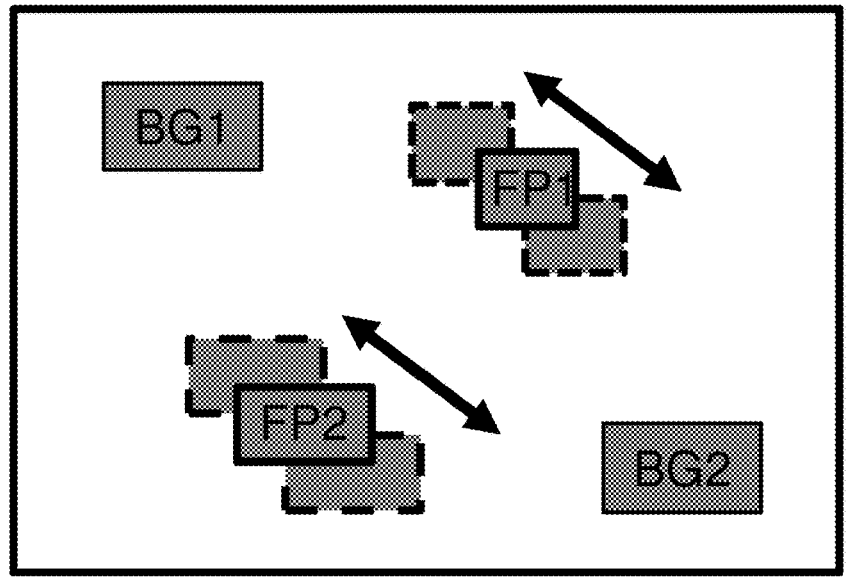
FIGS. 11A and 11B provide additional examples of perturbation of fingerprint features by low-frequency vibrations.
Figure 11B:
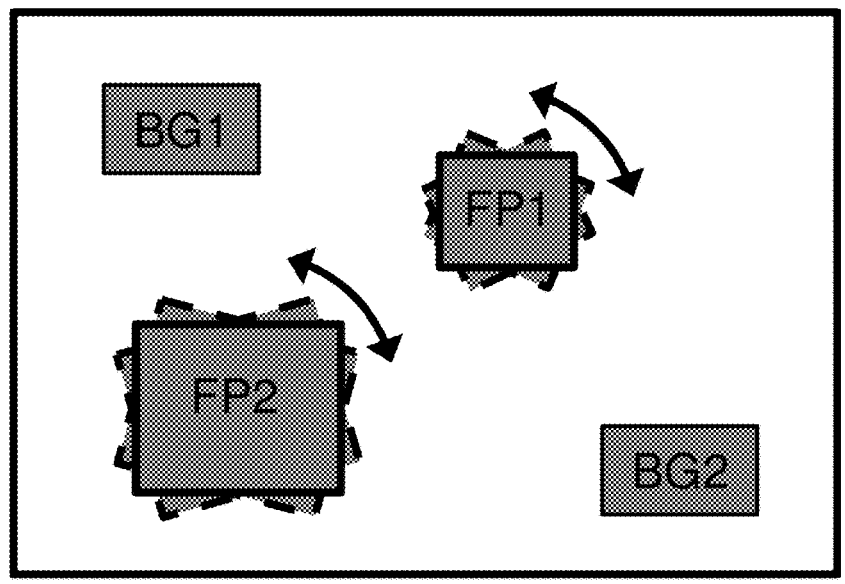

FIGS. 11A and 11B provide additional examples of perturbation of fingerprint features by low-frequency vibrations. FIG. 11A shows an example of lateral translation of fingerprint features caused by the applied low-frequency vibrations. The arrows shown in FIG. 11A show the directions in which the fingerprint features FP1 and FP2 are displaced. In FIG. 11A, BG1 and BG2 represent background features. The arrows also correspond with an axis along which one or more components of a fingerprint sensor are being displaced in response to the applied low-frequency vibrations. In the example shown in FIG. 11B, the applied low-frequency vibrations are causing a rotation of at least a part of the fingerprint sensor and corresponding rotation of the fingerprint features.

Figure 12:
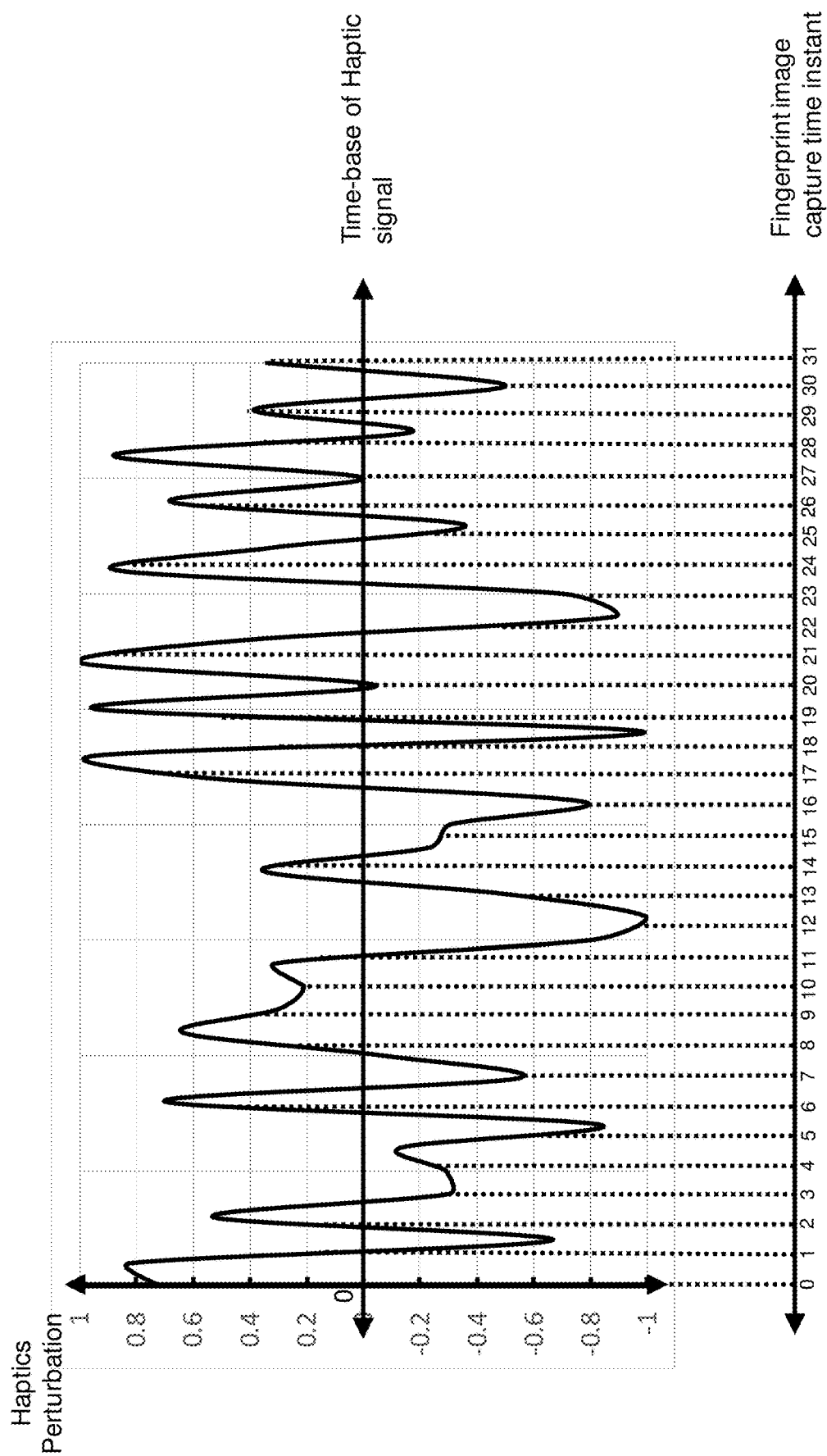
FIG. 12 shows an example in which the times at which fingerprint image data are captured are independent of the period and phase of the haptic perturbation waveform.

The implementations described with reference to FIGS. 6-10 involved instances in which the capturing of fingerprint image data by an ultrasonic sensor system was synchronized with a periodic haptic signal. FIG. 12 shows an example in which the times at which fingerprint image data are captured are independent of the period and phase of the haptic perturbation waveform. Such implementations may be referred to herein as "non-coherent detection" methods. According to some such implementations, the haptic perturbation waveform may not have a constant frequency or phase. In some instances, the haptic perturbation waveform may be aperiodic.

Figure 13:
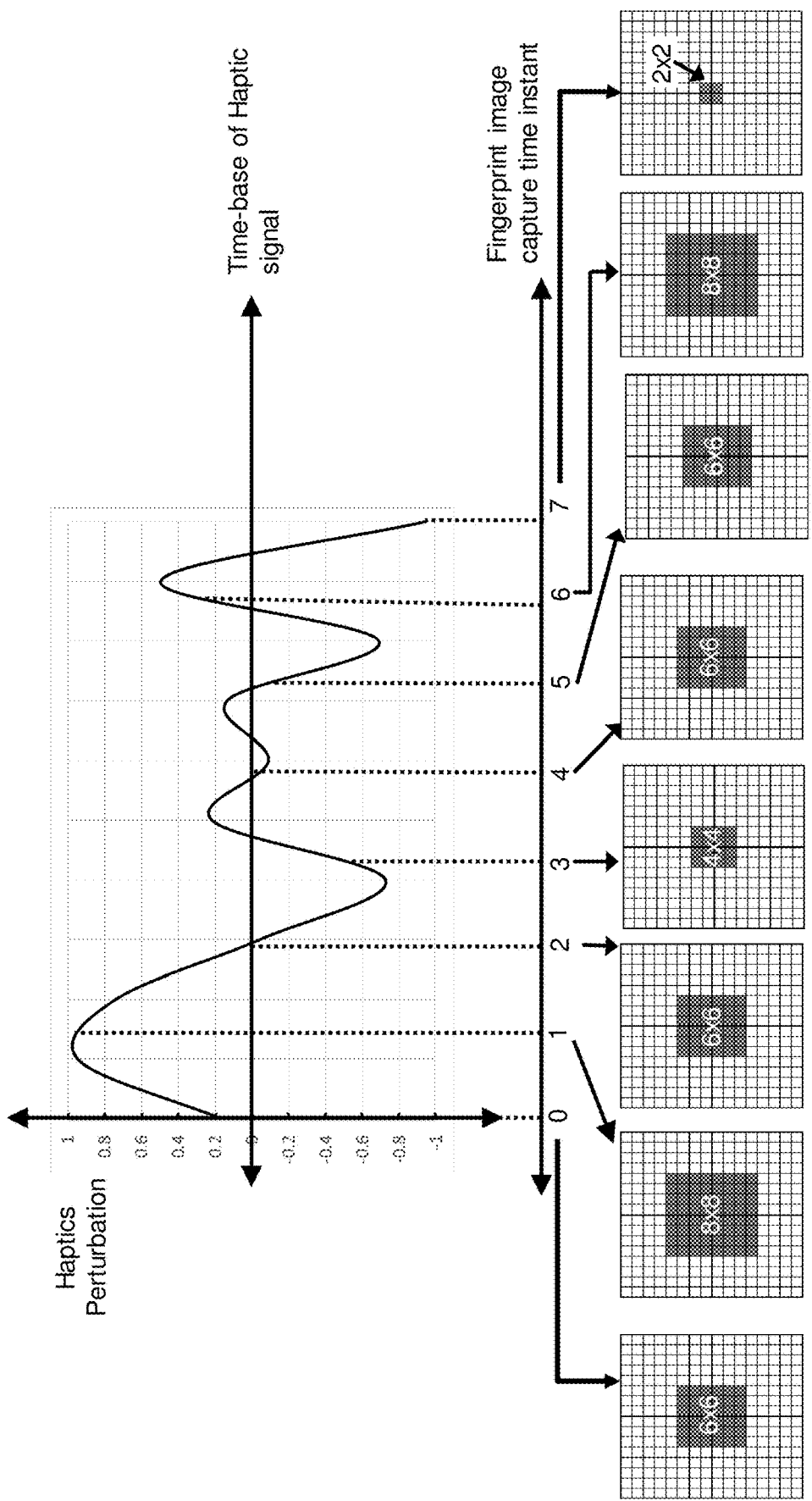
FIG. 13 shows another example in which the times at which fingerprint image data are captured are independent of the period and phase of the haptic perturbation waveform.

FIG. 13 shows another example in which the times at which fingerprint image data are captured are independent of the period and phase of the haptic perturbation waveform. According to this example, the perturbation of an actual fingerprint feature over 8 fingerprint image capture times is illustrated. To simplify the illustration, the fingerprint sensor 1305 is shown as a 16-pixel by 16-pixel square, and the fingerprint feature 1310 is simplified to a square-shaped pattern.

In this example, the actual fingerprint feature is spatially modulated by the haptic signal: here, the haptic signal causes an increase or decrease in the size of the fingerprint feature. According to this implementation, the unperturbed fingerprint feature is a 3-pixel by 3-pixel square. When the haptic signal is applied, in this example the fingerprint feature grows to as large as a 10-pixel by 10-pixel square and shrinks to as small as a 2-pixel by 2-pixel square. The extent of the expansion and compression of the actual fingerprint feature is related to the amplitude and phase of the haptic signal. In this example, when the amplitude is at or near zero, the fingerprint feature is a 6-pixel by 6-pixel square. According to this example, when the amplitude is at or near+1, the fingerprint feature is an 8-pixel by 8-pixel square. In this example, when the amplitude is at or near −1, the fingerprint feature is a 2-pixel by 2-pixel square.

Figure 14:
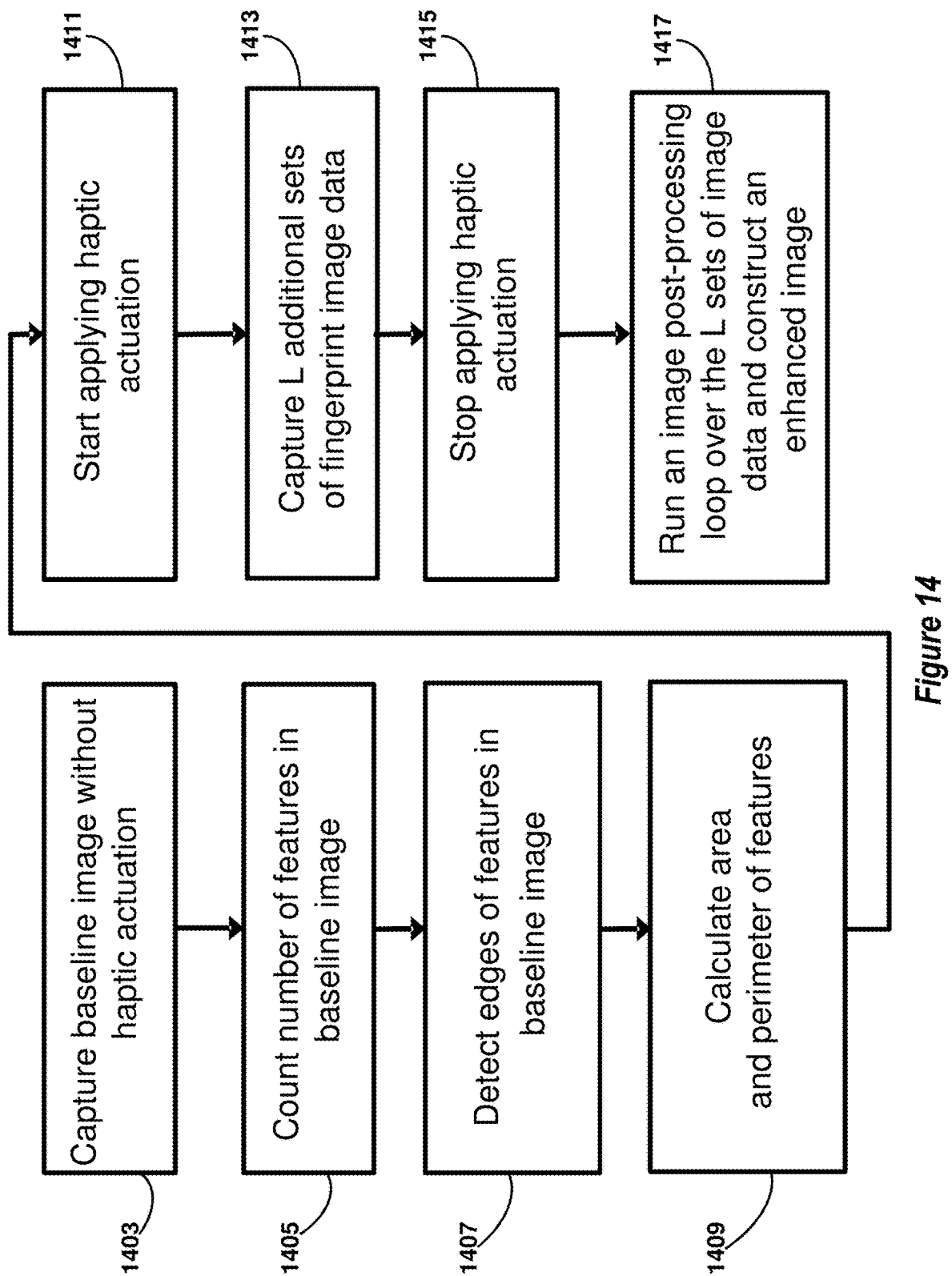
FIG. 14 is a flow diagram that provides example blocks of some non-coherent detection methods disclosed herein.

FIG. 14 is a flow diagram that provides example blocks of some non-coherent detection methods disclosed herein. The blocks of FIG. 14 may, for example, be performed by the apparatus 101 of FIG. 1 or by a similar apparatus. As with other methods disclosed herein, the method outlined in FIG. 14 may include more or fewer blocks than indicated. Moreover, the blocks of methods disclosed herein are not necessarily performed in the order indicated. In some examples, some blocks of methods disclosed herein may be performed concurrently.

In this example, block 1403 involves acquiring a baseline image (e.g., a set of what may be referred to herein as "fingerprint image data") at a time during which low-frequency vibrations are not being applied. For example, the baseline image may be captured without haptic actuation. In some such examples, block 1403 may involve controlling an ultrasonic transmitter to transmit first ultrasonic waves. Block 1403 may involve receiving first ultrasonic receiver signals from an ultrasonic receiver. The first ultrasonic receiver signals may include signals corresponding to first reflections of the ultrasonic waves from a target object (such as a finger) in contact with an outer surface of an apparatus.

Block 1403 or block 1405 may involve extracting features from the ultrasonic receiver signals. The features may include fingerprint features, such as the locations, orientations and/or types of fingerprint minutiae. However, in some instances the features may include both actual fingerprint features and background features. In this example, block 1405 involves counting a number of features in the baseline image. In some examples, block 1405 may involve counting all of the detected features in the baseline image, whereas in other examples block 1405 may involve counting some but not all of the features in the baseline image, e.g., every other feature, every third feature, every fourth feature, etc. The number of features counted may be referred to herein as M.

In this example, block 1407 involves detecting the edges of at least some features in the baseline image. According to some implementations, block 1407 may involve detecting the edges of each of the M features in the baseline image that were counted in block 1405. Block 1407 may involve determining edge coordinates corresponding to detected feature edges and storing the edge coordinates, at least temporarily, in a data structure.

According to this example, block 1409 involves calculating the area of each feature detected in block 1407. In some examples, as here, block 1409 also involves determining the perimeter of each feature detected in block 1407. Block 1409 may involve determining feature area data and feature perimeter data, and storing the feature area data and feature perimeter data, at least temporarily, in a data structure.

In some implementations, block 1409 may involve one or more iterative processes. In one such example, block 1409 may involve, for k=1 to k=M, in increments of 1, calculating the area and perimeter of every feature in the baseline image. This process may be represented as follows: for k=1:1:M, calculating the area[0,k] and perimeter[0,k] of every feature in the baseline image. In this example, the notation "k=1:1:M" indicates (starting point):(step size):(ending point). In some alternative examples, only a subset of the total number of features may be involved in this process, e.g., every other feature (k=1:2:M), every third feature (k=1:3:M), every fourth feature (k=1:4:M), every fifth feature (k=1:5:M), etc.

In this implementation, block 1411 involves controlling a low-frequency vibration source to generate low-frequency vibrations. In FIG. 14, generating the low-frequency vibrations is termed "haptic actuation," but as noted elsewhere herein the term "haptic" does not limit the disclosed methods to actuating a haptic device. Instead, any suitable type of device for generating low-frequency vibrations may be used.

In this example, block 1413 involves acquiring L additional sets of fingerprint image data at a time during which low-frequency vibrations are being applied, where L is an integer. The L sets of fingerprint image data may also be referred to as L images. In some examples, block 1413 may involve acquiring at least two additional sets of fingerprint image data. In some instances block 1413 may involve acquiring 3, 4, 5, 6, 7, 8, 9, 10, 11, 12, 13, 14, 15, 16, 17, 18, 19, 20 or more additional samples of fingerprint image data. In some such examples, block 1413 may involve controlling an ultrasonic transmitter to transmit L instances of ultrasonic waves. Block 1413 may involve receiving L sets of ultrasonic receiver signals from an ultrasonic receiver. The L sets of ultrasonic receiver signals may include signals corresponding to L sets of reflections of the ultrasonic waves from a target object (such as a finger) in contact with an outer surface of an apparatus. In this example, the generation of low-frequency vibrations is stopped in block 1415, after the processes of block 1413 are complete.

In this example, block 1417 involves running an image post-processing loop over the L sets of fingerprint image data that were acquired in block 1413. According to this example, block 1417 also involves constructing at least one enhanced image.

Figure 15:
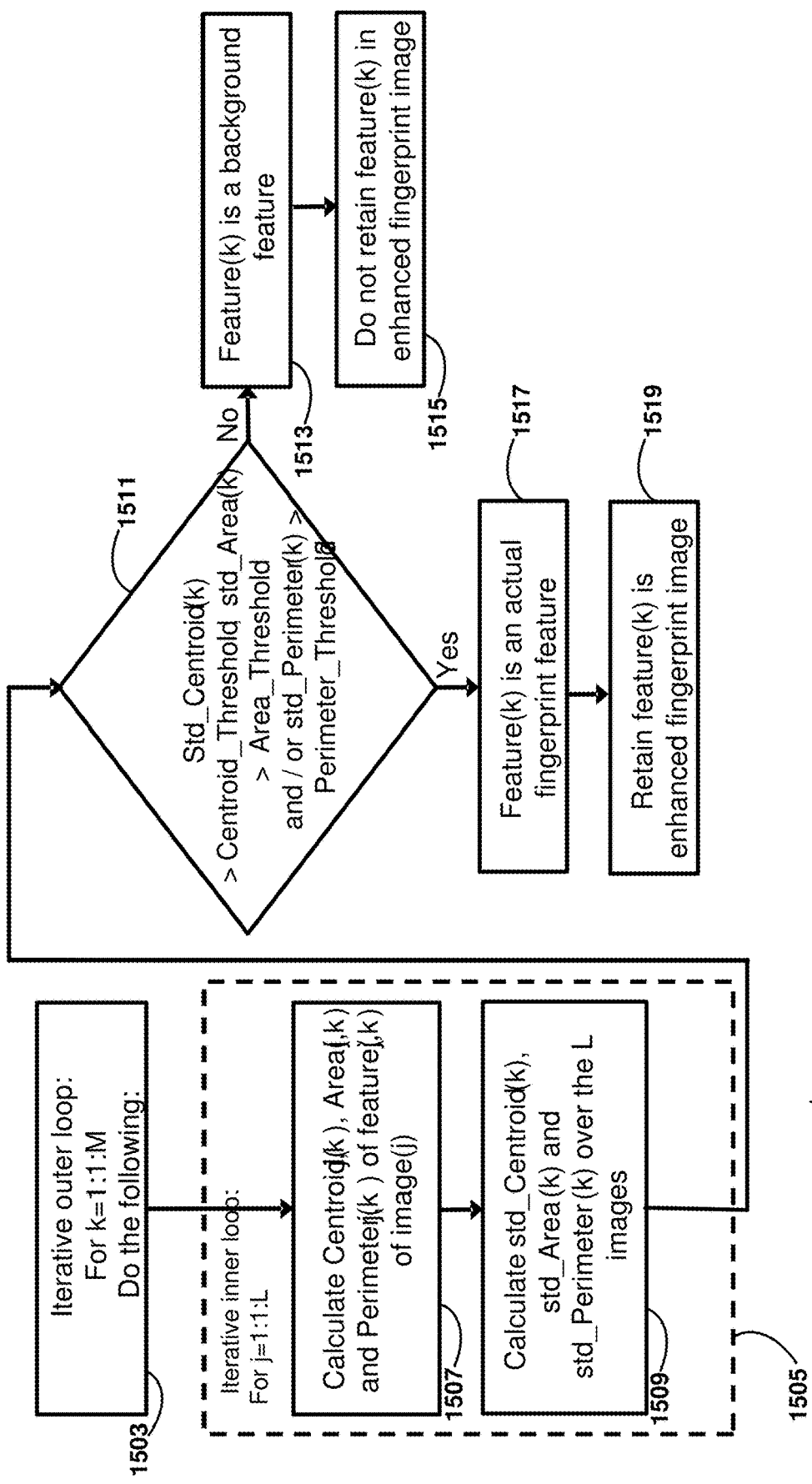
FIG. 15 is a flow diagram that provides an example of processes that may be involved in implementing block 1417 of FIG. 14.

FIG. 15 is a flow diagram that provides an example of processes that may be involved in implementing block 1417 of FIG. 14. The blocks of FIG. 15 may, for example, be performed by the apparatus 101 of FIG. 1 or by a similar apparatus. As with other methods disclosed herein, the method 1500 that is outlined in FIG. 15 may include more or fewer blocks than indicated. Moreover, the blocks of methods disclosed herein are not necessarily performed in the order indicated. In some examples, some blocks of methods disclosed herein may be performed concurrently.

According to this example, the method 1500 involves two nested loops, including an outer loop over the M features in the baseline image, and an inner loop over the L sets of fingerprint image data, or L images, that are referenced in blocks 1413 and 1417 of FIG. 14. In other words, the loops involve both the images and the features in each image. The L images were captured while haptics actuation was being applied (block 1411). According to this example, method 1500 involves obtaining statistical data for each of the features, which can then be evaluated to determine whether the feature is an actual fingerprint feature or a background feature.

In the example shown in FIG. 15, the L images are indexed as image (j), where j is between 1 and L, both of which are inclusive. According to this implementation, each image (j) has k features which are indexed as feature (j,k). In this example, each feature (j,k) has an area (j,k) and a perimeter (j,k), and the centroid vertical and horizontal spatial coordinates of each feature (j,k) are located at Centroid (j,k).

In this example, block 1503 involves an iterative outer loop over each of the M features in the baseline image, from k=1 to k=M, in increments of 1. In this example, the iterative inner loop of block 1505 includes the processes of sub-blocks 1507 and 1509. According to this example, the process of sub-block 1507 involves calculating, for a particular one of the features k, the centroid, area and perimeter across all of the images from j=1 to j=L. This is represented in block 1507 as calculating Centroid (j,k), Area (j,k) and Perimeter (j,k) of feature (j,k) of each image (j). According to this example, the process of sub-block 1509 involves calculating, for a particular one of the features k, the standard deviations of the centroids, areas and perimeters across all of the images from j=1 to j=L. This is represented in block 1507 as calculating the std_Centroid (k), std_Area (k) and std_Perimeter (k) for each of the L images.

In this example, block 1511 involves comparing the standard deviations of the centroids, areas and/or perimeters for a particular feature k to corresponding centroid, area and/or perimeter threshold values, which are denoted in FIG. 15 Centroid_Threshold, Area_Threshold and Perimeter_Threshold, respectively, in order to determine whether one or more of the thresholds are equaled or exceeded. As described elsewhere herein, including but not limited to the discussion above with reference to FIGS. 11A and 11B, if one or more such thresholds are exceeded it may be surmised that the feature k is an actual fingerprint feature (block 1517). Accordingly, in this example the feature will be retained for the enhanced fingerprint image in block 1519. If not, in this example it will be determined in block 1513 that the feature is a background feature. According to this example, the background feature will be omitted or deleted from the features to be included in the enhanced fingerprint image in block 1515.

In some examples block 1511 may involve comparing the standard deviations of the centroids, areas and perimeters for a particular feature k to corresponding centroid, area and perimeter threshold values. According to some such examples, it will be determined that the feature is an actual fingerprint feature only if all three thresholds are equaled or exceeded. In other implementations, it will be determined that the feature is an actual fingerprint feature if only two of the three thresholds are equaled or exceeded. In yet other implementations, it will be determined that the feature is an actual fingerprint feature if only one of the three thresholds is equaled or exceeded.

In other examples, block 1511 may involve comparing the standard deviations of the centroids and perimeters for a particular feature k to corresponding centroid and perimeter threshold values. In some examples block 1511 may involve comparing the standard deviations of the areas and perimeters for a particular feature k to corresponding area and perimeter threshold values. In other examples block 1511 may involve comparing the standard deviations only the centroids, the areas or the perimeters for a particular feature k to only one corresponding centroid, area or perimeter threshold value.

In the example shown in FIG. 15, the process of the iterative outer loop continues until all of the M features have been evaluated. In some such examples, the method 1500 ends after all M features have been evaluated.

Figure 16:
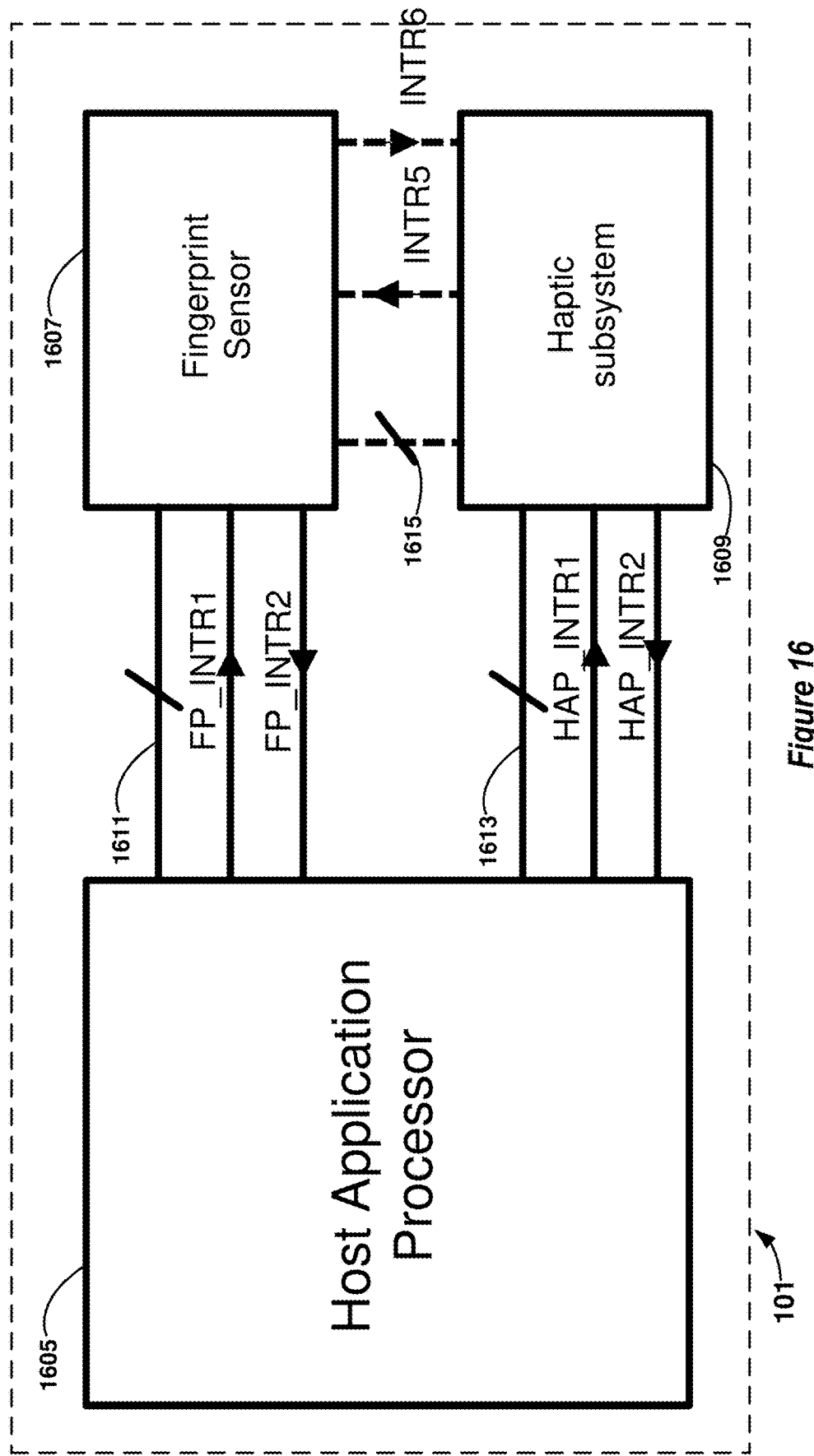
FIG. 16 shows example components of an apparatus according to one implementation.

FIG. 16 shows example components of an apparatus according to one implementation. In this example, the apparatus 101 includes a host application processor 1605, a fingerprint sensor 1607 and a haptic subsystem 1609. The host application processor 1605 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

The haptic subsystem 1609 includes some type of low-frequency vibration source and is not necessarily a haptic device. According to this example, the haptic subsystem 1609 includes a haptic controller and a haptic actuator. Accordingly, the haptic subsystem 1609 may include both a low-frequency vibration source 110 and a portion of the control system 106 that are described above with reference to FIG. 1.

The fingerprint sensor 1607 may, in some examples, include an ultrasonic sensor system like that described above with reference to FIG. 1. According to some implementations, the fingerprint sensor 1607 may include a portion of the control system 106 that is described above with reference to FIG. 1.

According to some implementations, the timing and activity of the fingerprint sensor 1607 and the haptic actuator of the haptic subsystem 1609 may be independently controlled by the host application-processor 1605, e.g., by software commands issued over independent digital interfaces 1611 and 1613. Digital interfaces 1611 and 1613 may, for example, be serial peripheral interfaces (SPIs) or inter-integrated circuit (I²C) interfaces. In this implementation, the timing and activity of the fingerprint sensor 1607 and the haptic subsystem 1609 may be independently controlled by the host application-processor via fingerprint sensor interrupt signals FP_INTR1 and haptic interrupt signals HAP_INTR1. In this example, the fingerprint sensor 1607 and the haptic subsystem 1609 provide fingerprint sensor interrupt signals FP_INTR2 and haptic interrupt signals HAP_INTR2 to the host application-processor 1605.

In this example, a digital interface 1615 is provided between the fingerprint sensor 1607 and the haptic actuator. Accordingly, one or more interrupt signals, such as INTR5 and INTR6, may be exchanged between the fingerprint sensor 1607 and the haptic actuator via the digital interface 1615. Such interrupt signals may allow the fingerprint sensor 1607 and the haptic actuator to synchronize the timing (frequency and phase) of fingerprint image data acquisition and haptic actuation by electrical hardware-level hand-shaking signals.

Some implementations may not include a digital interface between the fingerprint sensor 1607 and the haptic actuator. If this interface is not present, the fingerprint sensor and haptic activities may be synchronized according to commands transferred on the interfaces 1611 and 1613.

Figure 17:
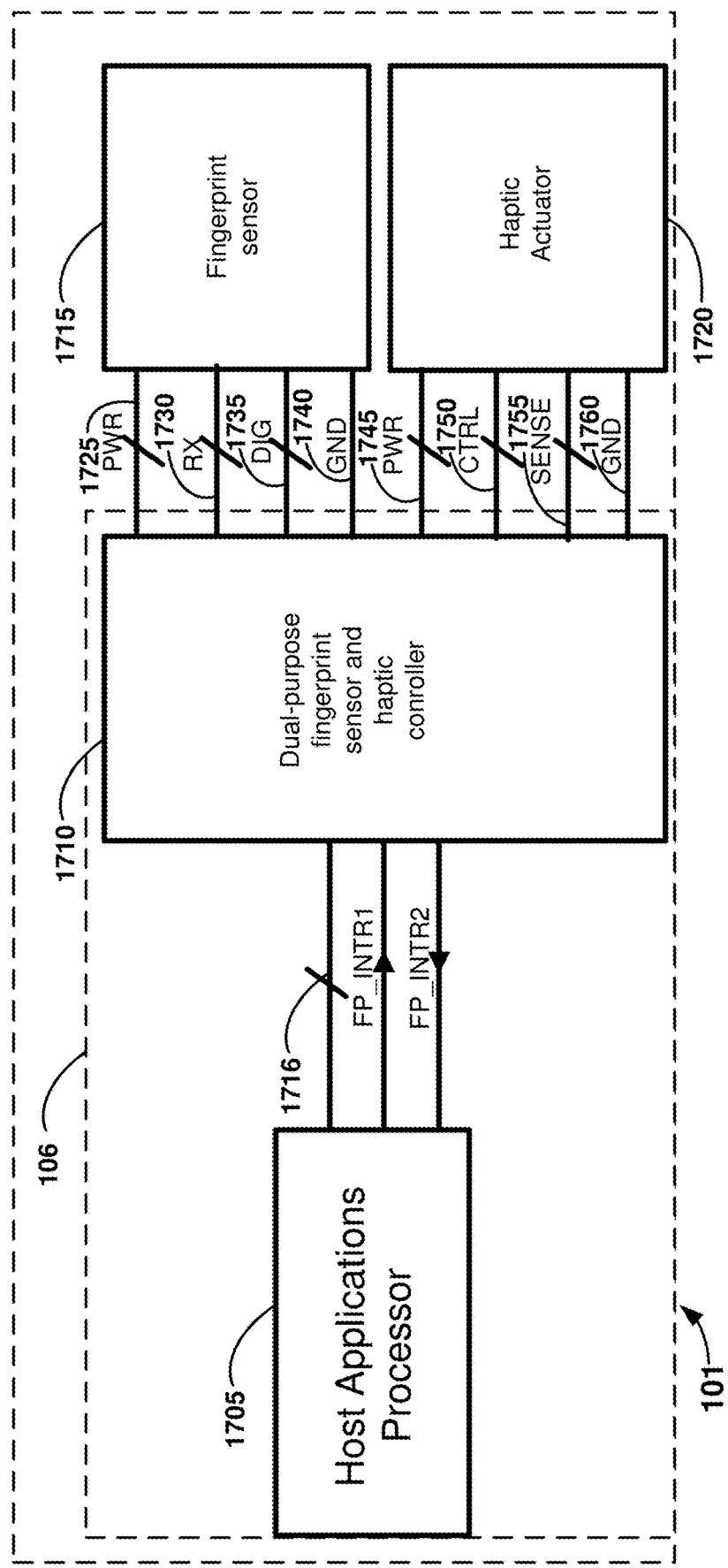
FIG. 17 shows example components of an apparatus according to an alternative implementation.

FIG. 17 shows example components of an apparatus according to an alternative implementation. In this example, the apparatus 101 includes a host application processor 1705, a dual-purpose fingerprint sensor and haptic controller 1710, a fingerprint sensor 1715 and a haptic actuator 1720. The host application processor 1705 and the dual-purpose fingerprint sensor and haptic controller 1710 may be included in the control system 106 that is described above with reference to FIG. 1. In this implementation, the timing and activity of the fingerprint sensor 1715 may be controlled by the host application-processor 1705 via fingerprint sensor interrupt signals FP_INTR1. In this example, the fingerprint sensor 1715 provides fingerprint sensor interrupt signals FP_INTR2 to the host application-processor 1705. The host application processor 1705 and the dual-purpose fingerprint sensor and haptic controller 1710 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

The fingerprint sensor 1715 may, in some examples, include an ultrasonic sensor system like that described above with reference to FIG. 1. As noted elsewhere herein, the haptic actuator 1720 is a low-frequency vibration source that is not necessarily a haptic device. For example, the haptic actuator 1720 may be a piezoelectric device, a linear resonant actuator, an eccentric rotating mass actuator, etc., as described with reference to low-frequency vibration source 110 of FIG. 1.

In this implementation, the dual-purpose fingerprint sensor and haptic controller 1710 is configured to control both the fingerprint sensor 1715 (including but not limited to any associated ultrasonic transducer) and the haptic actuator 1720 according to instructions from the host application-processor 1705, e.g., by software commands issued over digital interface 1716.

In this example, the interfaces between the dual-purpose fingerprint sensor and haptic controller 1710 and the fingerprint sensor 1715 (which may in some instances be constructed according to TFT (thin-film-transistor) technology) may include one or more power (PWR) supply interfaces 1725, one or more receive (Rx) signal interfaces 1730, one or more digital (DIG) interfaces 1735 (e.g., for scanning fingerprint sensor pixels of the fingerprint sensor system 1715) and a ground (GND) line 1740. As illustrative examples, the number of power supply interfaces 1725 may be 2, one each for analog and digital signals, the number of receive signal interfaces 1730 may be between 6 and 20, and the number of digital interfaces 1735 may be between 4 to 6.

According to this example, the interfaces between the dual-purpose fingerprint sensor and haptic controller 1710 and the haptic actuator 1720 may include one or more power supply interfaces 1745, one or more control signal interfaces 1750, one or more sense interfaces 1755 and a ground line 1760. The sense interfaces may, for example, detect the back electromotive force (emf), implement short-circuit protection or track the resonant frequency of the haptic perturbation. In this implementation, synchronization between operations of the haptic actuator 1720 and operations of the fingerprint sensor 1715 may be realized by communication along internal buses and other internal circuitry, and/or embedded firmware in the dual-purpose fingerprint sensor and haptic controller 1710.

Figure 18A:
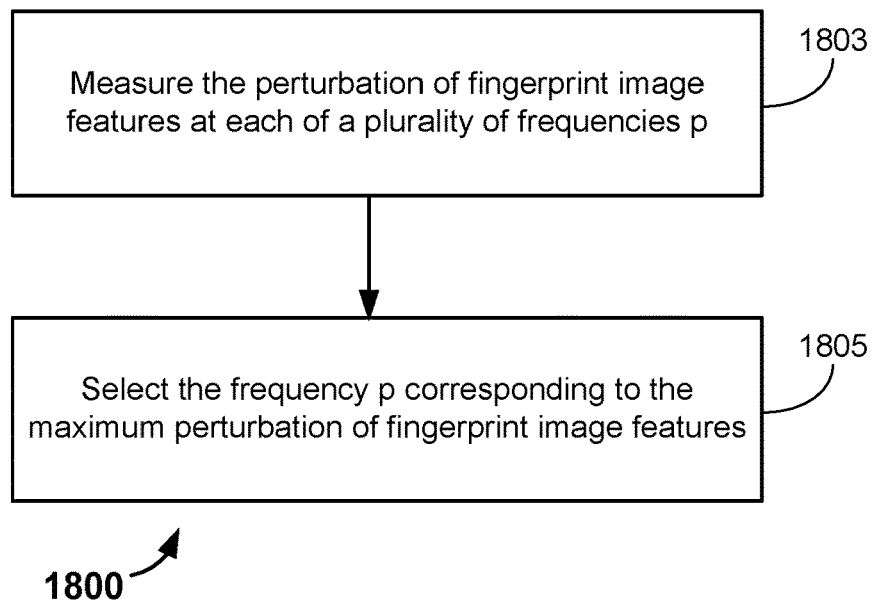
FIG. 18A is a flow diagram that provides example blocks of some methods disclosed herein.

FIG. 18A is a flow diagram that provides example blocks of some methods disclosed herein. The blocks of FIG. 18A may, for example, be performed by the apparatus 101 of FIG. 1 or by a similar apparatus. As with other methods disclosed herein, the method 1800 outlined in FIG. 18A may include more or fewer blocks than indicated. Moreover, the blocks of methods disclosed herein are not necessarily performed in the order indicated. In some examples, some blocks of methods disclosed herein may be performed concurrently.

In this example, method 1800 involves tuning the haptic actuation frequency so as to produce a maximum modulation of the fingerprint image features in response to the haptic perturbation. Maximizing the perturbation of the fingerprint image features may, in some instances, maximize the selectivity of actual fingerprint features vs background features, thereby maximizing the enhanced image quality after one or more of the disclosed haptic-based enhancement techniques are applied.

In this example, block 1803 involves an iterative process of measuring the perturbation of fingerprint image features at each of a plurality of frequencies p. In some examples, block 1803 may involve measuring the perturbation of fingerprint image features at a predetermined number of frequencies that are within a frequency ranges suitable for haptic actuation, e.g., vibrations in the range of 5 Hz to 400 Hz, in the range of 5 Hz to 800 Hz, in the range of 5 Hz to 1200 Hz, in the range of 5 Hz to 2000 Hz, etc. In cases where the haptic frequency has spectral content which is distributed over a range of frequencies, the frequency tuned may be the average frequency or the center frequency of a haptic actuation frequency range.

The predetermined number of frequencies may depend on various factors and may involve a trade-off between the desired level of accuracy and the amount of time required for implementing the method 1800. In some examples, the predetermined number of frequencies may be 10, 20, 30, 40, 50, 60, 70, 80, 90, 100, etc.

Figure 18B:
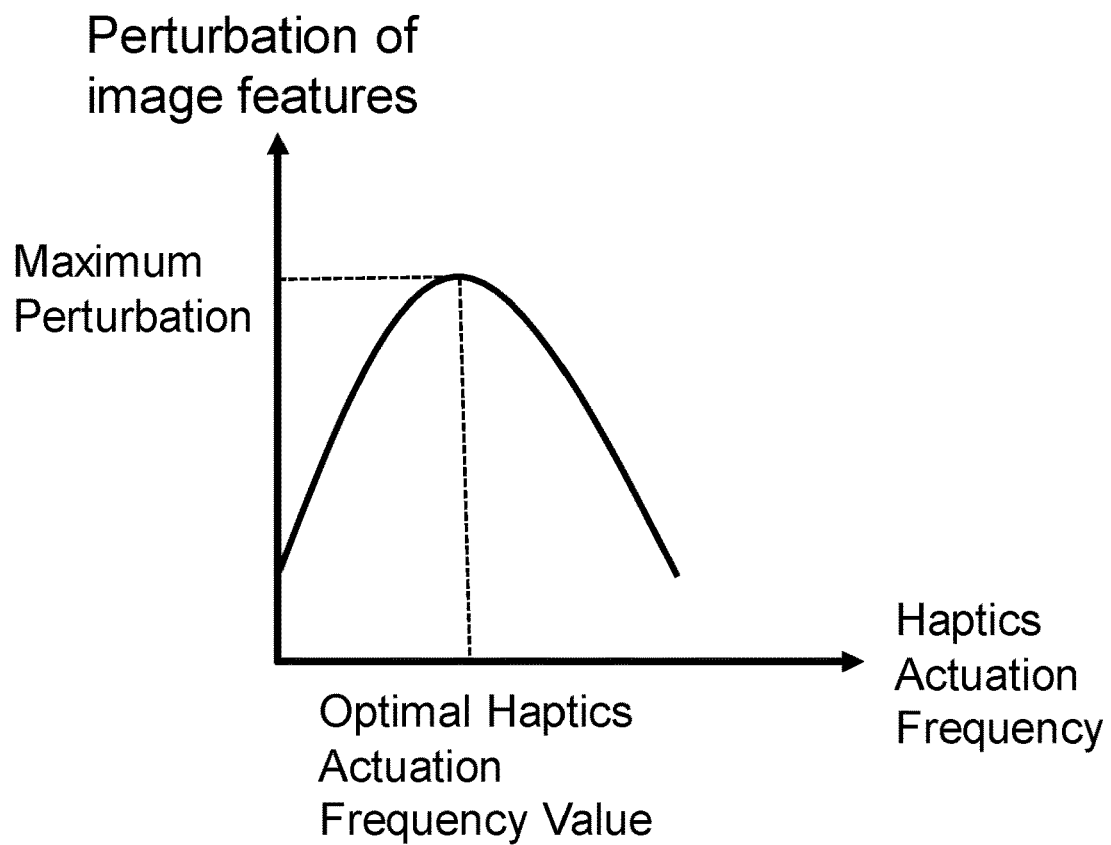
FIG. 18B is a graph of perturbation versus haptic frequency according to one example.

According to this example, block 1805 involves selecting the frequency p corresponding to the maximum perturbation of fingerprint image features. FIG. 18B is a graph of perturbation versus haptic frequency according to one example. The graph shown in FIG. 18B may, for example, be based on the frequency and perturbation values that are determined in block 1803 of FIG. 18A. In the example shown in FIG. 18B, the frequency corresponding to the local maximum perturbation value is selected as the optimal haptic actuation frequency. Determining this local maximum is one example of block 1805 of FIG. 18A.

Figure 19:
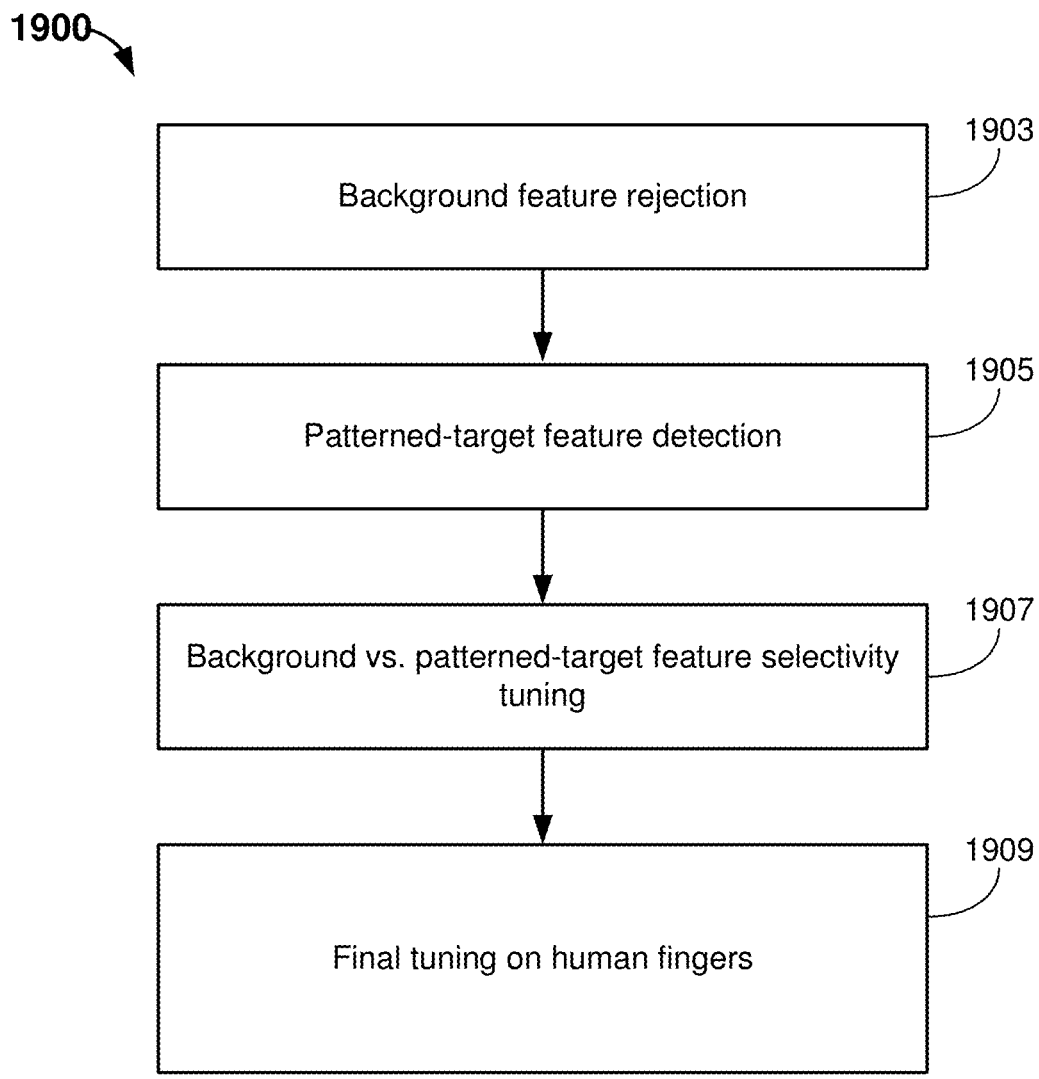
FIG. 19 is a flow diagram that provides example blocks of another disclosed method.

FIG. 19 is a flow diagram that provides example blocks of another disclosed method. The blocks of FIG. 19 may, for example, be performed by the apparatus 101 of FIG. 1 or by a similar apparatus. As with other methods disclosed herein, the method 1900 outlined in FIG. 19 may include more or fewer blocks than indicated. Moreover, the blocks of methods disclosed herein are not necessarily performed in the order indicated. In some examples, some blocks of methods disclosed herein may be performed concurrently.

In this example, method 1900 involves a procedure for refining the haptics-based image-enhancement processes disclosed herein. In some such implementations, method 1900 involves fine-tuning an algorithm's sensitivity to background features and selectivity of background features versus actual fingerprint-image features using sequentially more complex images. Depending on the particular implementation, method 1900 may involve refining a deterministic algorithm or refining a machine-learning-based adaptive algorithm.

According to this example, block 1903 is a background feature rejection process. According to some implementations, block 1903 may be an iterative background feature rejection process. In some such examples, block 1903 may involve controlling an ultrasonic fingerprint sensor to capture "air-only" images with no finger or other target object on the sensor, or on the device in which sensor resides. Accordingly, in such examples block 1903 involves capturing only background image features. In some such examples, block 1903 may involve applying one or more of the disclosed background feature detection and rejection processes. In some examples, block 1903 may involve capturing only background image features using sensors with exacerbated background aberrations such as adhesive marks, incorrect mechanical lamination of one or more layers of the sensor, or of the device in which sensor resides, etc.

According to some implementations, block 1903 may involve tuning algorithm thresholds and/or other detection parameters until all, or substantially all, background artifacts are detected and rejected. For example, in the case of an image with five background features, if an initial threshold of 1.0 leads to identification of three out of those five background features, then the threshold may be reduced to, for example, a value of 0.8 such that all of the five background features are appropriately identified. In some such implementations, the background image should be spatially uniform, or substantially uniform, after the process of block 1903. In some such implementations, a sufficiently or substantially uniform background image may have a variation between sensor pixels that is less than a threshold percentage, such as 0.5%, 1%, 1.5%, 2%, etc.

In this example, block 1905 is a patterned-target feature detection process. In some such examples, block 1905 may involve applying one or more of the disclosed methods to capture images with patterned targets. In some such examples, images with patterned targets may be captured using sensors with no background aberrations so that the captured image is only the actual image. According to some implementations, algorithm thresholds and/or other detection parameters may be tuned in block 1905 until all of the actual image features of the patterned targets are detected. In some such examples, block 1905 may involve comparing an enhanced image with a reference image of a patterned target. In one such example, the patterned target and the reference image may both include the same series of dashed lines, with a known (e.g., 1 mm) spacing between the lines. After implementing block 1905, the captured ultrasonic images should include the actual patterns of the target(s).

According to this example, block 1907 involves repeating block 1905 while using the above-described sensors with exacerbated background aberrations. In some implementations, block 1907 may involve tuning algorithm thresholds and/or other detection parameters until all fingerprint features of a predetermined set of fingerprint features are detected and all background features of a predetermined set of background features are rejected. According to some implementations, block 1907 may involve tuning algorithm thresholds and/or other detection parameters until the target patterns are detected even when actual features of the target patterns overlap with background features. In some implementations, block 1907 may involve an initial process using sensors with exacerbated background aberrations, then a subsequent process using sensors that have less severe aberrations. The subsequent process may, in some such examples, involve using patterned targets with relatively less distinct target features. In some such implementations, block 1907 may involve further refining the algorithm until even these less evident background features are rejected and faint actual-image features are detected.

According to some implementations, block 1909 may involve a process of capturing ultrasonic images from one or more actual human digits. Block 1909 may, for example, involve imaging actual fingerprints that have sparse fingerprint features, such as actual fingerprints that have a low spatial frequency content. According to some examples, block 1909 may involve a subsequent process that involves imaging actual fingerprints having fingerprint features that have relatively more overlap with the background features, imaging actual fingerprints having a higher spatial-image frequency, etc., than the fingerprints used in the earlier stages of block 1909. In some implementations, block 1909 may involve tuning algorithm thresholds and/or other detection parameters until all fingerprint features of a predetermined set of fingerprint features are detected and all background features of a predetermined set of background features are rejected. After these goals have been attained, in some examples method 1900 ends.

Figure 20:
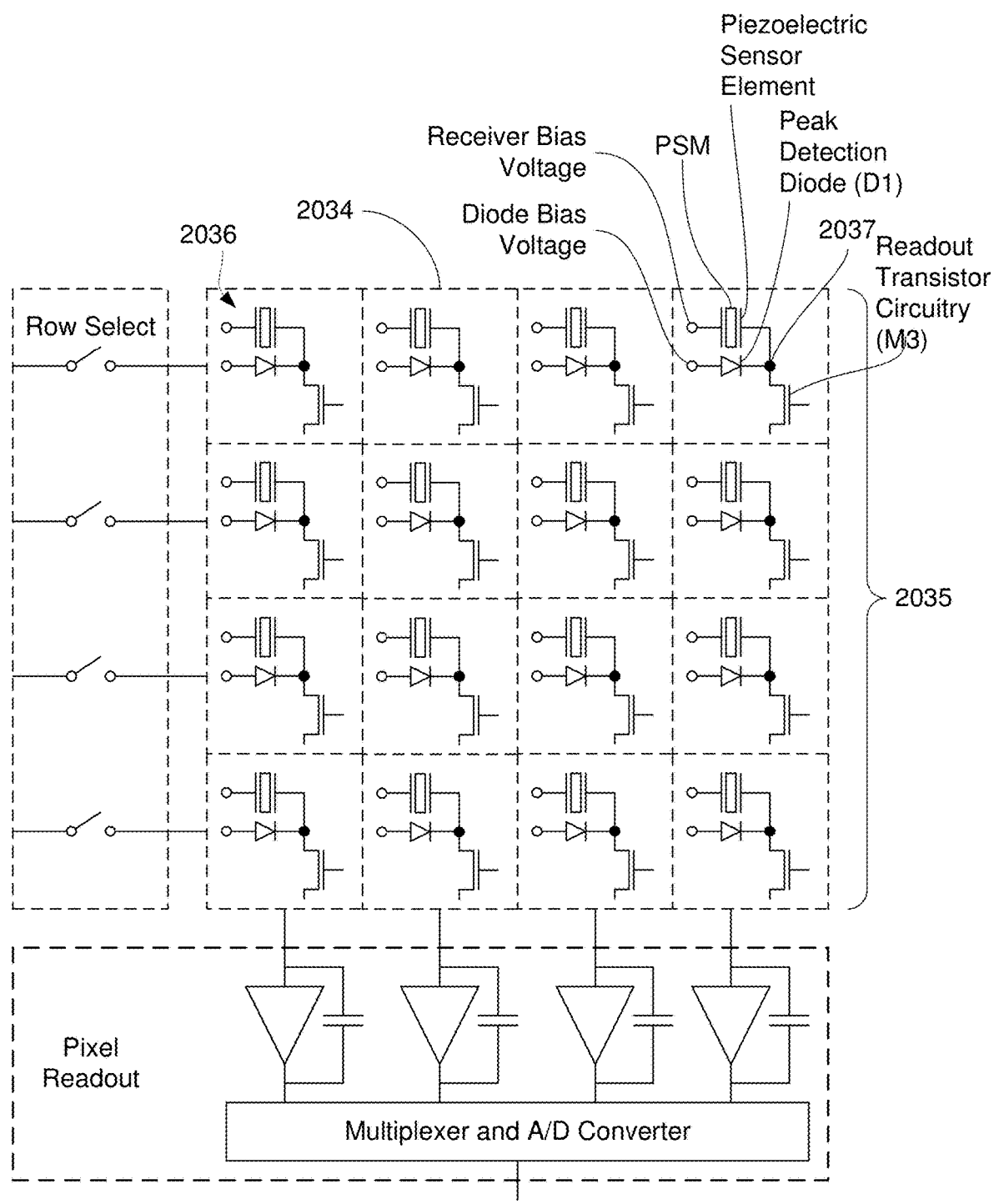
FIG. 20 representationally depicts aspects of a 4×4 pixel array of sensor pixels for an ultrasonic sensor system.

FIG. 20 representationally depicts aspects of a 4×4 pixel array of sensor pixels for an ultrasonic sensor system. Each sensor pixel 2034 may be, for example, associated with a local region of piezoelectric sensor material (PSM), a pixel input electrode 2037, a peak detection diode (D1) and a readout transistor circuitry (M3); many or all of these elements may be formed on or in a substrate to form the pixel circuit 2036. In practice, the local region of piezoelectric sensor material of each sensor pixel 2034 may transduce received ultrasonic energy into electrical charges. The peak detection diode D1 may register the maximum amount of charge detected by the local region of piezoelectric sensor material PSM. Each row of the pixel array 2035 may then be scanned, e.g., through a row select mechanism, a gate driver, or a shift register, and the readout transistor circuitry M3 for each column may be triggered to allow the magnitude of the peak charge for each sensor pixel 2034 to be read by additional circuitry, e.g., a multiplexer and an A/D converter. The pixel circuit 2036 may include one or more TFTs to allow gating, addressing, and resetting of the sensor pixel 2034.

Each pixel circuit 2036 may provide information about a small portion of the object detected by the ultrasonic sensor system. While, for convenience of illustration, the example shown in FIG. 20 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 8 mm×3 mm, 5 mm×5 mm or 9 mm×4 mm for a single finger to about 3 inches×3 inches for four fingers. Smaller and larger areas, including square, rectangular and non-rectangular geometries, may be used as appropriate for the target object.

Figure 21A:
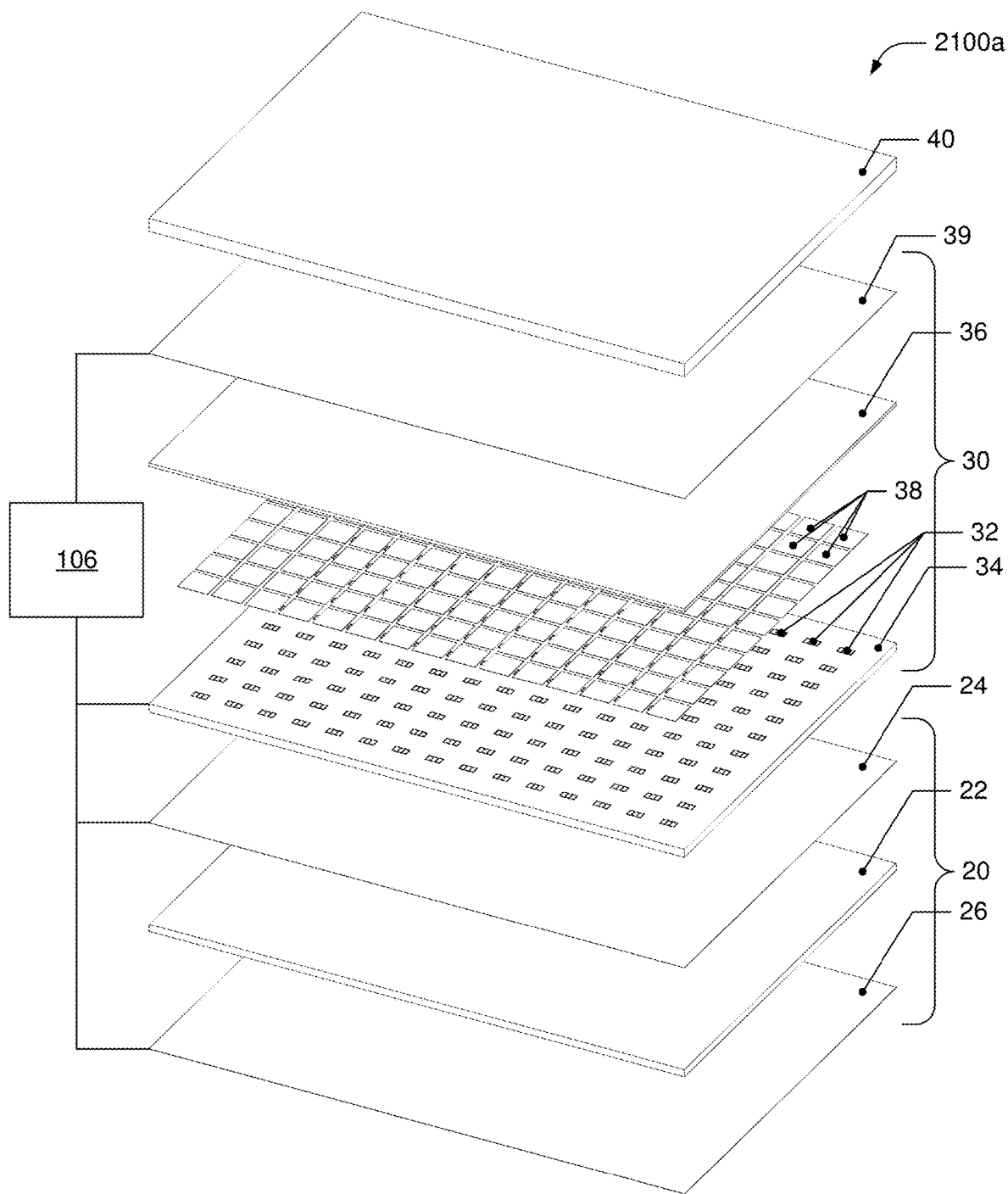
FIGS. 21A and 21B show example arrangements of ultrasonic transmitters and receivers in an ultrasonic sensor system, with other arrangements being possible.

FIG. 21A shows an example of an exploded view of an ultrasonic sensor system. In this example, the ultrasonic sensor system 2100*a* includes an ultrasonic transmitter 20 and an ultrasonic receiver 30 under a platen 40. According to some implementations, the ultrasonic receiver 30 may be an example of the ultrasonic receiver 103 that is shown in FIG. 1 and described above. In some implementations, the ultrasonic transmitter 20 may be an example of the ultrasonic transmitter 105 that is shown in FIG. 1 and described above. The ultrasonic transmitter 20 may include a substantially planar piezoelectric transmitter layer 22 and may be configured for functioning as a plane wave generator. Ultrasonic waves may be generated by applying a voltage to the piezoelectric layer to expand or contract the layer, depending upon the signal applied, thereby generating a plane wave. In this example, the control system 106 may be configured for causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This generated ultrasonic wave may travel towards a finger (or other object to be detected), passing through the platen 40. A portion of the wave not absorbed or transmitted by the object to be detected may be reflected so as to pass back through the platen 40 and be received by the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may be configured to convert surface charge generated by the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into surface charge by the piezoelectric receiver layer 36. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be configured for processing the amplified signals received from the sensor pixel circuits 32.

The control system 106 may be configured for controlling the ultrasonic transmitter 20 and/or the ultrasonic receiver 30 to obtain ultrasonic data, which may include fingerprint data. According to some implementations, the control system 106 may be configured for providing functionality such as that described herein.

Whether or not the ultrasonic sensor system 2100a includes a separate ultrasonic transmitter 20, in some implementations the control system 106 may be configured for obtaining attribute information from the ultrasonic data. In some examples, the control system 106 may be configured for controlling access to one or more devices based, at least in part, on the attribute information. The ultrasonic sensor system 2100a (or an associated device) may include a memory system that includes one or more memory devices. In some implementations, the control system 106 may include at least a portion of the memory system. The control system 106 may be configured for obtaining attribute information from ultrasonic data and storing the attribute information in the memory system. In some implementations, the control system 106 may be configured for capturing a fingerprint image, obtaining attribute information from the fingerprint image and storing attribute information obtained from the fingerprint image (which may be referred to herein as fingerprint image information) in the memory system. According to some examples, the control system 106 may be configured for capturing a fingerprint image, obtaining attribute information from the fingerprint image and storing attribute information obtained from the fingerprint image even while maintaining the ultrasonic transmitter 20 in an "off" state.

In some implementations, the control system 106 may be configured for operating the ultrasonic sensor system 2100a in an ultrasonic imaging mode or a force-sensing mode. In some implementations, the control system may be configured for maintaining the ultrasonic transmitter 20 in an "off" state when operating the ultrasonic sensor system in a force-sensing mode. The ultrasonic receiver 30 may be configured for functioning as a force sensor when the ultrasonic sensor system 2100a is operating in the force-sensing mode. In some implementations, the control system 106 may be configured for controlling other devices, such as a display system, a communication system, etc. In some implementations, the control system 106 may be configured for operating the ultrasonic sensor system 2100a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is configured for imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 μm thick and a PVDF-TrFE receiver layer 36 is approximately 12 μm thick. Example frequencies of the ultrasonic waves may be in the range of 5 MHz to 30 MHz, with wavelengths on the order of a millimeter or less.

Figure 21B:
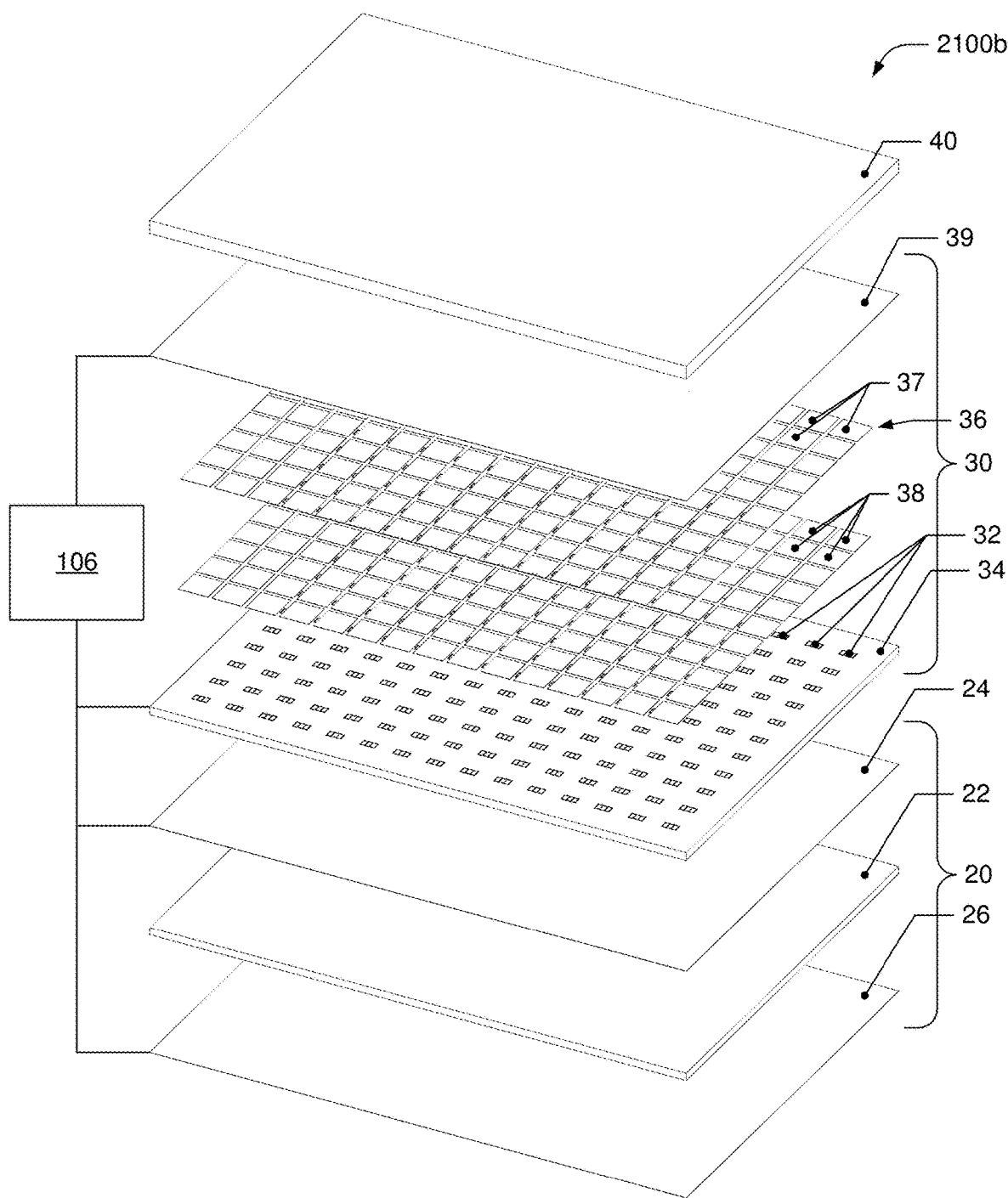

FIG. 21B shows an exploded view of an alternative example of an ultrasonic sensor system. In this example, the piezoelectric receiver layer 36 has been formed into discrete elements 37. In the implementation shown in FIG. 21B, each of the discrete elements 37 corresponds with a single pixel input electrode 38 and a single sensor pixel circuit 32. However, in alternative implementations of the ultrasonic sensor system 2100b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 21A and 21B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30, In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

Figure 21C:
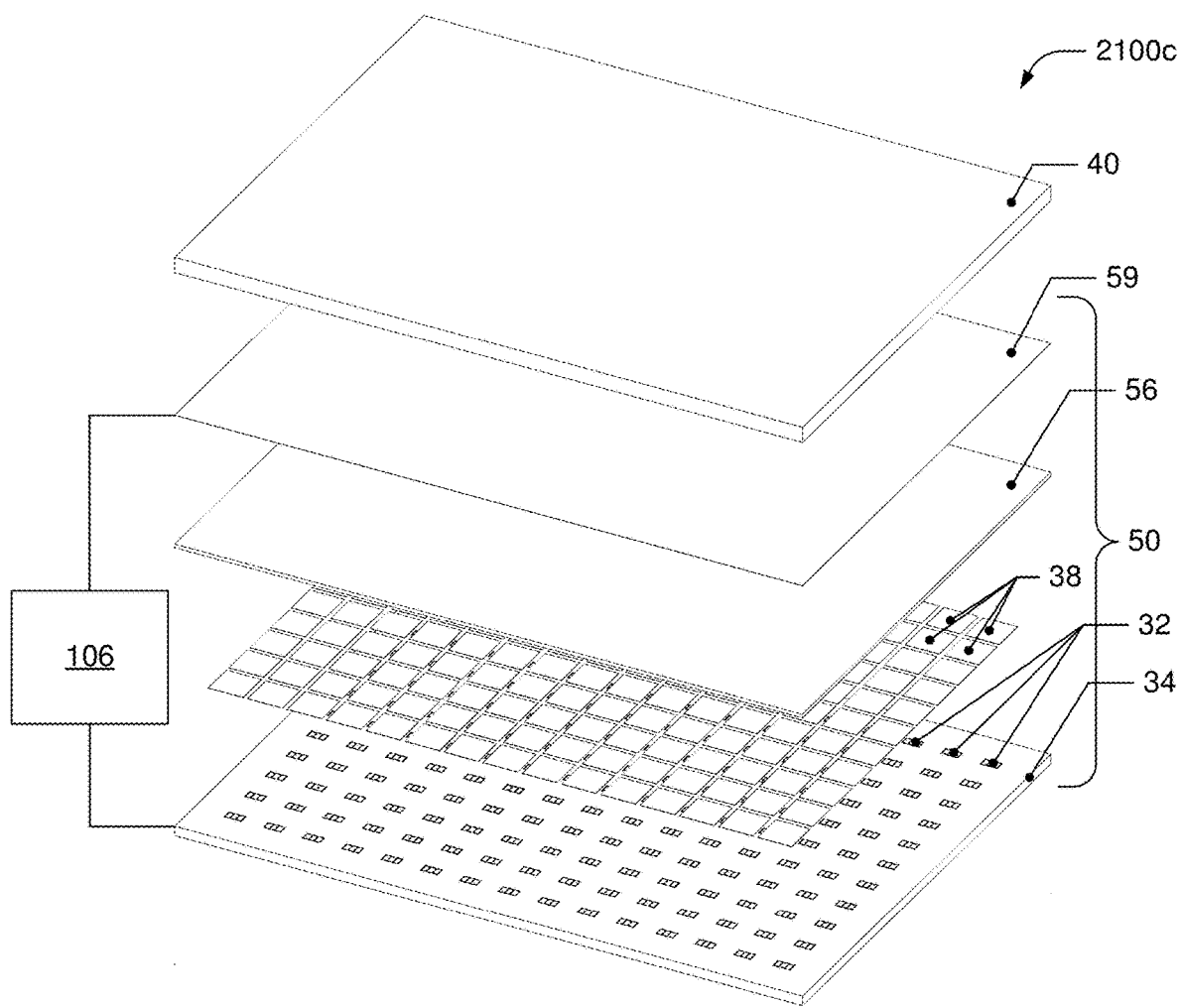
FIG. 21C shows an example of an ultrasonic transceiver array in an ultrasonic sensor system.

FIG. 21C shows an exploded view of an example of an ultrasonic sensor system. In this example, the ultrasonic sensor system 2100c includes an ultrasonic transceiver array 50 under a platen 40. According to some implementations, the ultrasonic transceiver array 50 may serve as both the ultrasonic receiver 103 and the ultrasonic transmitter 105 that is shown in FIG. 1 and described above. The ultrasonic transceiver array 50 may include a substantially planar piezoelectric transceiver layer 56 configured for functioning as a plane wave generator. Ultrasonic waves may be generated by applying a voltage across the transceiver layer 56. The control system 106 may be configured for generating a transceiver excitation voltage that may be applied to the piezoelectric transceiver layer 56 via one or more underlying pixel input electrodes 38 or one or more overlying transceiver bias electrodes 59. The generated ultrasonic wave may travel towards a finger or other object to be detected, passing through the platen 40. A portion of the wave not absorbed or transmitted by the object may be reflected so as to pass back through the platen 40 and be received by the ultrasonic transceiver array 50.

The ultrasonic transceiver array 50 may include an array of sensor pixel circuits 32 disposed on a substrate 34. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may include a pixel input electrode 38 that electrically couples the piezoelectric transceiver layer 56 to the sensor pixel circuit 32.

In the illustrated implementation, the transceiver bias electrode 59 is disposed on a side of the piezoelectric transceiver layer 56 proximal to the platen 40. The transceiver bias electrode 59 may be a metallized electrode and may be grounded or biased to control which signals may be generated and which reflected signals may be passed to the array of sensor pixel circuits 32. Ultrasonic energy that is reflected from the exposed (top) surface of the platen 40 may be converted into surface charge by the piezoelectric transceiver layer 56. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) to the transceiver bias electrode 59 and the sensor pixel circuits 32 on the sensor substrate 34. In some implementations, the control system 106 may operate substantially as described above. For example, the control system 106 may be configured for processing the amplified signals received from the sensor pixel circuits 32.

The control system 106 may be configured for controlling the ultrasonic transceiver array 50 to obtain ultrasonic data, which may include fingerprint data. According to some implementations, the control system 106 may be configured for providing functionality such as that described herein, e.g., such as described herein.

In other examples of an ultrasonic sensor system with an ultrasonic transceiver array, a backside of the sensor substrate 34 may be attached directly or indirectly to an overlying platen 40. In operation, ultrasonic waves generated by the piezoelectric transceiver layer 56 may travel through the sensor substrate 34 and the platen 40, reflect off a surface of the platen 40, and travel back through the platen 40 and the sensor substrate 34 before being detected by sensor pixel circuits 32 on or in the substrate sensor 34.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
an ultrasonic transmitter configured to transmit ultrasonic waves in the range of 1 MHz to 30 MHz;
a low-frequency vibration source configured to generate low-frequency vibrations in the range of 5 Hz to 2000 Hz;
wherein the ultrasonic transmitter and the low-frequency vibration source are mechanically coupled;
an ultrasonic receiver; and
a control system including one or more general purpose single- or multi-chip processors, digital signal processors (DSPs), one or more application specific integrated circuits (ASICs), one or more field programmable gate arrays (FPGAs) or other programmable logic devices, one or more discrete gates or transistor logic, one or more discrete hardware components, or combinations thereof, the control system being configured to:
control the ultrasonic transmitter for transmission of first ultrasonic waves;
control the low-frequency vibration source for generation of first low-frequency vibrations;
synchronize the generation of the first low-frequency vibrations and the transmission of the first ultrasonic waves, wherein synchronizing the generation of first low-frequency vibrations and the transmission of first ultrasonic waves comprises:
controlling the low-frequency vibration source for generation of the first low-frequency vibrations during a first time interval; and
controlling the ultrasonic transmitter for transmission of the first ultrasonic waves during a second time interval that at least partially coincides with the first time interval;
receive ultrasonic receiver signals from the ultrasonic receiver, the ultrasonic receiver signals including signals corresponding to reflections of the first ultrasonic waves from a target object in contact with an outer surface of the apparatus; and
perform an authentication process based, at least in part, on the ultrasonic receiver signals.

2. The apparatus of claim 1, wherein the low-frequency vibration source comprises one or more of a haptic device, a speaker, a piezoelectric actuator, an eccentric rotating mass or a linear resonant actuator.

3. The apparatus of claim 1, wherein the low-frequency vibration source is configured to cause at least one of localized low-frequency vibration of only a portion of the apparatus or to cause global low-frequency vibration of the entire apparatus.

4. The apparatus of claim 1, wherein the low-frequency vibration source and the ultrasonic transmitter are included in a single device.

5. The apparatus of claim 1, wherein the control system is further configured to:
determine a contact quality metric corresponding to at least one of an image quality metric or a feature quality metric; and determine whether to actuate the low-frequency vibration source based, at least in part, on the contact quality metric.

6. The apparatus of claim 1, wherein the control system is configured to control the low-frequency vibration source to generate at least one of a single frequency or multiple frequencies.

7. The apparatus of claim 1, wherein the control system is configured to control the low-frequency vibration source to generate low-frequency vibrations at least one of intermittently or continuously.

8. The apparatus of claim 1, wherein the control system is configured to extract features from the ultrasonic receiver signals and wherein the authentication process is based, at least in part, on the features.

9. The apparatus of claim 8, wherein the control system is configured to:
determine at least one feature quality metric;
determine whether the at least one feature quality metric is below a feature quality metric threshold; and, responsive to determining that the at least one feature quality metric is below the feature quality metric threshold, controlling the low-frequency vibration source for generation of second low-frequency vibrations having a higher amplitude than the amplitude of the first low-frequency vibrations.

10. The apparatus of claim 1, wherein the control system is configured to:
determine at least one feature quality metric;
use the feature quality metric as a feedback signal for the low-frequency vibration source; and
control the low-frequency vibration source based, at least in part, on the feedback signal.

11. The apparatus of claim 1, wherein an ultrasonic transceiver layer comprises the ultrasonic transmitter and the ultrasonic receiver.

12. An authentication method, comprising:
controlling an ultrasonic transmitter for transmission of first ultrasonic waves;
controlling a low-frequency vibration source for generation of first low-frequency vibrations;
synchronizing the generation of the first low-frequency vibrations and the transmission of the first ultrasonic waves, wherein synchronizing the generation of first low-frequency vibrations and the transmission of first ultrasonic waves comprises:
controlling the low-frequency vibration source for generation of the first low-frequency vibrations during a first time interval; and
controlling the ultrasonic transmitter for transmission of the first ultrasonic waves during a second time interval that at least partially coincides with the first time interval;
receiving ultrasonic receiver signals from an ultrasonic receiver, the ultrasonic receiver signals including signals corresponding to reflections of the first ultrasonic waves from a target object in contact with an outer surface of an apparatus; and
performing an authentication process based, at least in part, on the ultrasonic receiver signals.

13. The method of claim 12, further comprising detecting background noise in the ultrasonic receiver signals based, at least in part, on the first low-frequency vibrations.

14. The method of claim 12, wherein controlling the low-frequency vibration source comprises at least one of causing localized low-frequency vibration of only a portion of the apparatus or global low-frequency vibration of the entire apparatus.

15. The method of claim 12, wherein controlling the low-frequency vibration source and controlling the ultrasonic transmitter comprise controlling a single device.

16. The method of claim 12, wherein controlling the low-frequency vibration source comprises causing the low-frequency vibration source to generate the first low-frequency vibrations in the plane of the outer surface or perpendicular to the plane of the outer surface.

17. The method of claim 12, wherein controlling the low-frequency vibration source comprises causing the low-frequency vibration source to generate at least one of a single frequency or multiple frequencies.

18. The method of claim 12, wherein controlling the low-frequency vibration source comprises causing the low-frequency vibration source to generate low-frequency vibrations at least one of intermittently or continuously.

19. The method of claim 12, further comprising extracting features from the ultrasonic receiver signals, wherein the authentication process is based, at least in part, on the features.

20. The method of claim 19, further comprising:
determining at least one feature quality metric;
using the feature quality metric as a feedback signal for the low-frequency vibration source; and
controlling the low-frequency vibration source based, at least in part, on the feedback signal.

21. The method of claim 19, further comprising:
determining at least one feature quality metric;
determining whether the at least one feature quality metric is below a feature quality metric threshold; and, responsive to determining that the at least one feature quality metric is below the feature quality metric threshold, controlling the low-frequency vibration source for generation of second low-frequency vibrations having a higher amplitude than the amplitude of the first low-frequency vibrations.

22. One or more non-transitory media having software stored thereon, the software including instructions for controlling one or more devices to perform an authentication method, the authentication method comprising:
controlling an ultrasonic transmitter for transmission of first ultrasonic waves;
controlling a low-frequency vibration source for generation of first low-frequency vibrations;
synchronizing the generation of the first low-frequency vibrations and the transmission of the first ultrasonic waves, wherein synchronizing the generation of first low-frequency vibrations and the transmission of first ultrasonic waves comprises:
controlling the low-frequency vibration source for generation of the first low-frequency vibrations during a first time interval; and
controlling the ultrasonic transmitter for transmission of the first ultrasonic waves during a second time interval that at least partially coincides with the first time interval;
receiving ultrasonic receiver signals from an ultrasonic receiver, the ultrasonic receiver signals including signals corresponding to reflections of the first ultrasonic waves from a target object in contact with an outer surface of an apparatus; and
performing an authentication process based, at least in part, on the ultrasonic receiver signals.

23. An apparatus, comprising:
transmitting means for transmitting ultrasonic waves in the range of 1 MHz to 30 MHz;
generating means for generating low-frequency vibrations in the range of 5 Hz to 2000 Hz;
receiving means for receiving ultrasonic waves; and
control means for:
- controlling the transmitting means for transmission of first ultrasonic waves;
- controlling the generating means for generation of first low-frequency vibrations;
- synchronizing the generation of the first low-frequency vibrations and the transmission of the first ultrasonic waves, wherein synchronizing the generation of first low-frequency vibrations and the transmission of first ultrasonic waves comprises:
  - controlling the low-frequency vibration source for generation of the first low-frequency vibrations during a first time interval; and
  - controlling the ultrasonic transmitter for transmission of the first ultrasonic waves during a second time interval that at least partially coincides with the first time interval;
- receiving ultrasonic receiver signals from the receiving means, the ultrasonic receiver signals including signals corresponding to reflections of the first ultrasonic waves from a target object in contact with an outer surface of the apparatus; and
- performing an authentication process based, at least in part, on the ultrasonic receiver signals.

* * * * *